US007611394B2

(12) United States Patent
Kawate et al.

(10) Patent No.: US 7,611,394 B2
(45) Date of Patent: Nov. 3, 2009

(54) METHOD OF MANUFACTURING ELECTRON-EMITTING ELEMENT USING CATALYST TO GROW CARBON FIBERS BETWEEN OPPOSITE ELECTRODES

(75) Inventors: Shinichi Kawate, Kanagawa (JP); Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 11/676,903

(22) Filed: Feb. 20, 2007

(65) Prior Publication Data

US 2007/0141943 A1 Jun. 21, 2007

Related U.S. Application Data

(62) Division of application No. 11/262,986, filed on Nov. 1, 2005, now abandoned, which is a division of application No. 09/940,642, filed on Aug. 29, 2001, now Pat. No. 7,012,362.

(30) Foreign Application Priority Data

Sep. 1, 2000 (JP) ............................ 2000/265821
Aug. 24, 2001 (JP) ............................ 2001/254638

(51) Int. Cl.
*H01J 9/02* (2006.01)
*H01J 9/04* (2006.01)

(52) U.S. Cl. ............................ 445/49; 445/50; 445/51; 977/842; 977/843

(58) Field of Classification Search ......... 313/309–311, 313/495–497; 445/49–51; 977/842–843, 977/939
See application file for complete search history.

(56) References Cited

U.S. PATENT DOCUMENTS 4,728,851 A 3/1988 Lambe ...................... 313/309
4,816,289 A 3/1989 Komatsu et al. ......... 423/447.3
4,900,483 A 2/1990 Witzke et al. ............... 313/309
4,904,895 A 2/1990 Tsukamoto et al. ......... 313/336
4,956,578 A 9/1990 Shimizu et al. ................ 315/3

(Continued)

FOREIGN PATENT DOCUMENTS

CN 1181607 A 5/1998

(Continued)

OTHER PUBLICATIONS

C.A. Spindt et al., *Physical Properties of thin-Film Field Emission Cathodes with Molybdenum Cones*, Journal of Applied Physics, vol. 47, No. 12 (1976) pp. 5248-5263.

(Continued)

*Primary Examiner*—Mariceli Santiago
(74) *Attorney, Agent, or Firm*—Fitzpatrick, Cella, Harper & Scinto

(57) ABSTRACT

Provided are electron-emitting devices, electron sources, and image-forming apparatus improved in electron emission efficiency and in convergence of trajectories of emitted electrons. An electron-emitting device has a first electrode and a second electrode placed in opposition to each other with a gap between first and second electrodes on a surface of a substrate, and a plurality of fibers electrically connected to the first electrode and containing carbon as a main component, and the fibers are placed on a surface of the first electrode facing the second electrode.

5 Claims, 13 Drawing Sheets

2 4 5 6 3 1 Z X

U.S. PATENT DOCUMENTS

| | | | | |
|---|---|---|---|---|
| 5,066,883 | A | 11/1991 | Yoshioka et al. | 313/309 |
| 5,185,554 | A | 2/1993 | Nomura et al. | 313/495 |
| 5,192,240 | A | 3/1993 | Komatsu | 445/24 |
| 5,214,346 | A | 5/1993 | Komatsu | 313/309 |
| 5,382,867 | A | 1/1995 | Maruo et al. | 313/309 |
| 5,443,859 | A | 8/1995 | Nagata | 427/122 |
| 5,458,784 | A | 10/1995 | Baker et al. | 210/674 |
| 5,500,200 | A | 3/1996 | Mandeville et al. | 423/447.3 |
| 5,543,684 | A | 8/1996 | Kumar et al. | 313/495 |
| 5,551,903 | A | 9/1996 | Kumar et al. | 445/24 |
| 5,577,943 | A | 11/1996 | Vickers et al. | 445/24 |
| 5,610,471 | A | 3/1997 | Bandy et al. | 313/309 |
| 5,612,587 | A | 3/1997 | Itoh et al. | 313/309 |
| 5,618,875 | A | 4/1997 | Baker et al. | 524/495 |
| 5,690,997 | A | 11/1997 | Grow | 427/249.1 |
| 5,726,524 | A | 3/1998 | Debe | 313/309 |
| 5,770,918 | A | 6/1998 | Kawate et al. | 313/495 |
| 5,773,921 | A | 6/1998 | Keesmann et al. | 313/309 |
| 5,847,495 | A | 12/1998 | Yamanobe et al. | 313/310 |
| 5,863,601 | A * | 1/1999 | Kikuchi et al. | 427/200 |
| 5,872,422 | A | 2/1999 | Xu et al. | 313/311 |
| 5,872,541 | A | 2/1999 | Yoshioka et al. | 345/74.1 |
| 5,935,639 | A | 8/1999 | Sullivan et al. | 427/78 |
| 5,965,267 | A | 10/1999 | Nolan et al. | 428/408 |
| 5,973,444 | A | 10/1999 | Xu et al. | 313/309 |
| 5,981,305 | A | 11/1999 | Hattori | 438/20 |
| 5,982,091 | A | 11/1999 | Konishi | 313/495 |
| 5,986,389 | A | 11/1999 | Tsukamoto | 313/309 |
| 6,087,765 | A | 7/2000 | Coll et al. | 313/309 |
| 6,129,602 | A | 10/2000 | Yamanobe | 445/24 |
| 6,135,839 | A | 10/2000 | Iwase et al. | 445/24 |
| 6,147,449 | A | 11/2000 | Iwasaki et al. | 313/495 |
| 6,171,162 | B1 | 1/2001 | Iwasaki et al. | 445/6 |
| 6,184,610 | B1 | 2/2001 | Shibata et al. | 313/309 |
| 6,204,597 | B1 | 3/2001 | Xie et al. | 313/310 |
| 6,228,904 | B1 | 5/2001 | Yadav et al. | 523/210 |
| 6,231,413 | B1 | 5/2001 | Tsukamoto | 445/24 |
| 6,246,168 | B1 | 6/2001 | Kishi et al. | 313/495 |
| 6,283,812 | B1 | 9/2001 | Jin et al. | 445/24 |
| 6,288,494 | B1 | 9/2001 | Tsukamoto et al. | 315/169.1 |
| 6,290,564 | B1 | 9/2001 | Talin et al. | 445/50 |
| 6,313,572 | B1 | 11/2001 | Yamada | 313/310 |
| 6,331,690 | B1 | 12/2001 | Yudasaka et al. | 219/121.6 |
| 6,333,016 | B1 | 12/2001 | Resasco et al. | 423/447.3 |
| 6,390,612 | B1 | 5/2002 | Kotaki et al. | 347/85 |
| 6,400,091 | B1 | 6/2002 | Deguchi et al. | 315/169.1 |
| 6,413,487 | B1 | 7/2002 | Resasco et al. | 423/447.3 |
| 6,445,006 | B1 | 9/2002 | Brandes et al. | 257/76 |
| 6,448,709 | B1 | 9/2002 | Chuang et al. | 313/497 |
| 6,455,021 | B1 | 9/2002 | Saito | 423/447.3 |
| 6,471,936 | B1 | 10/2002 | Chen et al. | 423/658.2 |
| 6,472,814 | B1 | 10/2002 | Yamanobe et al. | 313/495 |
| 6,541,906 | B2 | 4/2003 | Lee et al. | 313/495 |
| 6,605,894 | B2 | 8/2003 | Choi et al. | 313/495 |
| 6,626,719 | B2 | 9/2003 | Ono et al. | 445/24 |
| 6,628,053 | B1 | 9/2003 | Den et al. | 313/310 |
| 6,848,962 | B2 | 2/2005 | Kitamura et al. | 445/24 |
| 6,853,126 | B2 | 2/2005 | Nomura | 313/492 |
| 6,858,990 | B2 | 2/2005 | Tsukamoto | 315/169.1 |
| 6,948,995 | B2 | 9/2005 | Ishikura et al. | 445/51 |
| 7,067,336 | B1 | 6/2006 | Kyogaku et al. | 438/20 |
| 2001/0006232 | A1 | 7/2001 | Choi et al. | 257/10 |
| 2002/0009637 | A1 | 1/2002 | Murakami et al. | 429/213 |
| 2002/0031972 | A1 | 3/2002 | Kitamura et al. | 445/3 |
| 2002/0047562 | A1 | 4/2002 | Kitamura et al. | 315/169.3 |
| 2002/0057045 | A1 | 5/2002 | Tsukamoto | 313/309 |
| 2002/0074947 | A1 | 6/2002 | Tsukamoto | 315/169.3 |
| 2002/0136896 | A1 | 9/2002 | Takikawa et al. | 428/408 |
| 2002/0146958 | A1 | 10/2002 | Ono et al. | 445/24 |
| 2003/0006684 | A1 | 1/2003 | Kawate et al. | 313/311 |
| 2003/0048055 | A1 | 3/2003 | Ishikura et al. | 313/311 |
| 2003/0048056 | A1 | 3/2003 | Kitamura et al. | 313/311 |
| 2003/0222560 | A1 | 12/2003 | Roach | 313/311 |

FOREIGN PATENT DOCUMENTS

| | | | |
|---|---|---|---|
| EP | 0 290 026 | A1 | 11/1988 |
| EP | 0 394 698 | A2 | 10/1990 |
| EP | 0 433 507 | A1 | 6/1991 |
| EP | A1 443 865 | | 8/1991 |
| EP | 0 290 026 | B1 | 2/1993 |
| EP | 0 535 953 | A2 | 4/1993 |
| EP | 0 614 209 | A1 | 9/1994 |
| EP | 0 535 953 | B1 | 1/1996 |
| EP | 0 716 439 | A1 | 6/1996 |
| EP | 0 758 028 | A2 | 2/1997 |
| EP | 0 797 233 | A2 | 9/1997 |
| EP | 0 836 217 | A1 | 4/1998 |
| EP | A1 871 195 | | 10/1998 |
| EP | 0 913 508 | A2 | 5/1999 |
| EP | 0 913 508 | A3 | 5/1999 |
| EP | 0 936 650 | A1 | 8/1999 |
| EP | A1 936 650 | | 8/1999 |
| EP | 0 980 089 | A1 | 2/2000 |
| EP | 0 451 208 | B1 | 3/2000 |
| EP | 0 986 084 | A2 | 3/2000 |
| EP | 1 022 763 | A1 | 7/2000 |
| EP | 1 096 533 | A1 | 5/2001 |
| EP | 1 102 299 | A1 | 5/2001 |
| EP | 1 113 478 | A1 | 7/2001 |
| EP | 1 117 118 | A1 | 7/2001 |
| EP | 1 120 877 | A1 | 8/2001 |
| EP | 1 122 344 | A2 | 8/2001 |
| EP | 1 187 161 | A2 | 3/2002 |
| EP | 0 758 028 | B1 | 9/2002 |
| GB | 2 308 495 | A | 6/1997 |
| JP | 1-309242 | | 12/1989 |
| JP | 2-112125 | | 4/1990 |
| JP | 3-20941 | | 1/1991 |
| JP | 03-260119 | | 11/1991 |
| JP | 03-295131 | | 12/1991 |
| JP | 04-212236 | | 3/1992 |
| JP | 05-159696 | | 6/1993 |
| JP | 05-198253 | | 8/1993 |
| JP | 5-211029 | | 8/1993 |
| JP | 05-274997 | | 10/1993 |
| JP | 7-6714 | | 1/1995 |
| JP | 08-115652 | | 5/1996 |
| JP | 8-115652 | | 5/1996 |
| JP | 8-264109 | | 10/1996 |
| JP | 08-298068 | | 11/1996 |
| JP | 9-82214 | | 3/1997 |
| JP | 09-188600 | | 7/1997 |
| JP | 09-237565 | | 9/1997 |
| JP | 09-237565 | A | 9/1997 |
| JP | 10-289650 | | 10/1998 |
| JP | 11-139815 | | 5/1999 |
| JP | 11-162334 | | 6/1999 |
| JP | 11-194134 | | 7/1999 |
| JP | 11-232997 | | 8/1999 |
| JP | 2000-57934 | | 2/2000 |
| JP | 2000-86216 | | 3/2000 |
| JP | 2000-90809 | | 3/2000 |
| JP | 2000-95509 | | 4/2000 |
| JP | 2000-191302 | | 7/2000 |
| JP | 2000-207983 | | 7/2000 |
| JP | 2000-208028 | | 7/2000 |
| JP | 2000-223005 | | 8/2000 |
| JP | 2000/277003 | | 10/2000 |
| JP | 2000-277003 | | 10/2000 |
| JP | 2000-191302 | A | 11/2000 |
| JP | 2001-52598 | | 2/2001 |
| JP | 2001-052598 | | 2/2001 |
| JP | 2001-162600 | | 6/2001 |

| | | | |
|---|---|---|---|
| JP | 2001-288625 A | | 10/2001 |
| JP | 2002-500415 | | 1/2002 |
| WO | WO 89/07163 | | 8/1989 |
| WO | WO 90/07023 | | 6/1990 |
| WO | WO 98/05920 | | 2/1998 |
| WO | WO 99/58748 | | 11/1999 |
| WO | WO 01/26130 | | 4/2001 |
| WO | 01/93292 | A1 | 12/2001 |
| WO | WO 01/93292 | A1 | 12/2001 |

OTHER PUBLICATIONS

R.T.K. Baker et al., "Formation of Carbonaceous Deposits from the Platinum-Iron Catalyzed Decomposition of Acyetylene," 37 J. Catal. 101-105 (1975).

R.T.K. Baker, "Catalytic Growth of Carbon Filaments," 27 (3) Carbon 315-323 (1989).

S. Iijima, "Helical Microtubules of Graphitic Carbon," Nature, vol. 345, 56-58 (1991).

T. W. Ebbesen et al., "Large-Scale Synthesis of Carbon Nanotubes," Nature, vol. 358, 220-222 (1992).

W. A. DeHeer et al., "Aligned Carbon Nanotube Films: Production and Optical and Electronic Properties," Science vol. 268, 845-847 (1995).

T. Guo et al.,"Catalytic Growth of Single- Walled Nanotubes by Laser Vaporization," Chem Phys. Lett., vol. 243, 49-54 (1995).

A. G. Rinzler et al., "Unraveling Nanotubes: Field Emission from an Atomic Wire," Science, vol. 269, 1550-1553 (1995).

W. A. DeHeer et al., "A Carbon Nanotube Field-Emission Electron Source," Science, vol. 270, 1179-1180 (1995).

T. Kyotani et al., "Preparation of Ultrafine Carbon Tubes in Nanochannels of an Anodic Aluminum Oxide Film," Chem. Mater., vol. 8, 2109-2113 (1996).

A. Thess et al., "Crystalline Ropes of Metallic Carbon Nanotubes," Science, vol. 273 483-487 (1996).

H. Dai et al., "Single-Wall Nanotubes Produced by Metal-Catalyzed Disproportionation of Carbon Monoxide," Chem. Phys. Lett., vol. 260, 471-475 (1996).

H. Dai et al., "Nanotubes as Nanoprobes in Scanning Probe Microscopy," Nature, vol. 384, 147-150 (1996).

A. C. Dillon et al., "Storage of Hydrogen in Single- Walled Carbon Nanotubes," Nature, vol. 386, 377-379 (1997).

W.P. Dyke et al., "Field Emission", *Advances in Electronics and Electron Physics*, vol. 8, (1956) pp. 89-185.

C.A. Mead, "Operation of Tunnel-Emission Devices", *Journal of Applied Physics*, vol. 32, No. 4, (1961), pp. 646-652.

Toshiaki Kusunoki et al., "Fluctuation-Free Electron Emission from Non-Formed Metal-Insulator-Metal (MIM) Cathodes Fabricated by Low Current Anodic Oxidation", *Japanese Journal of Applied Physics*, vol. 32 No. 11B, (1993), p. L1695-1697.

M.I. Elinson et al., "The Emission of Hot Electrons and the Field Emission of Electrons from Tin Oxide", *Radio Engineering and Electronic Physics*, (1965) pp. 1290-1296.

G. Dittmer, "Electrical Conduction and Electron Emission of Discontinuous Thin Films", *Thin Solid Films*, vol. 9, (1972) pp. 317-329.

M. Hartwell et al., "Strong Electron Emission from Patterned Tin-Indium Oxide Thin Films", IEEE Trans. Ed. Conf., (1983) pp. 519-521.

Hisashi Araki et al., Electroforming and Electron Emission of Carbon Thin Films, Journal of the Vacuum Society of Japan, 1983 (with English Abstract on p. 22).

Rodriguez et al., "Catalytic Engineering of Carbon Nanostructures," Langmuir 11, 3862-3866 (1995).

W. Zhu et al., *Electron Field Emission From Nanostructured Diamond and Carbon Nanotubes*, Solid State Electronics, vol. 45, 2001, pp. 921-928.

J.M. Bonard et al., *Field Emission From Carbon Nanotubes: The First Five Years*, Solid State Electronics, vol. 45, 2001, pp. 893-914.

A.M. Rao et al., "In Situ-grown Carbon Nanotube Array of with Excellent Field Emission Characteristics," Applied Physics Letter, vol. 76, No. 25, pp. 3813-3815 (2000).

Cheol Jin Lee et al., "Carbon Nanofibers Grown on Sodalime Glass at 500° C. Using Thermal Chemical Vapor Deposition," Chemical Physics Letters 340, pp. 413-418 (2001).

Sashiro Uemura et al., "Carbon Nanotube FED with Graphite-Nano-Fiber Emitters," ISSN 1083-1312, pp. 398-401.

Q. H. Wang et al., "A Nanotube-Based Field-Emission Flat Panel Display," Applied Physics Letters, vol. 72, No. 22, Jun. 1998, pp. 2912-2913.

Paper entitled Reason for Refusal (pp. 2-7), which is an English translation of part of a 2004 Japanese Official Letter.

Xucun Ma et al., Polymerized carbon nanobells and their field-emission properties, Applied Physics Letters, Nov. 15, 1999, vol. 75, No. 20, pp. 3105-3107.

* cited by examiner

HIGH VOLTAGE TERMINAL Hv
97
96
91
92
93
94
95
81
82
83
84
Doyn
Doy(n−1)
Doy2
Doy1
Dox1
Dox2
Dox(m−1)
Doxm
X
Y
Z

METHOD OF MANUFACTURING ELECTRON-EMITTING ELEMENT USING CATALYST TO GROW CARBON FIBERS BETWEEN OPPOSITE ELECTRODES

RELATED APPLICATION

This application is a division of U.S. patent application Ser. No. 11/262,986, filed Nov. 1, 2005, now abandoned which is a division of U.S. patent application Ser. No. 09/940,642, filed Aug. 29, 2001, now U.S. Pat. No. 7,012,362, issued Mar. 14, 2006.

BACKGROUND OF THE INVENTION

1. Field of the Invention

The present invention relates to electron-emitting devices for emission of electrons, electron sources using them, and image-forming apparatus using the electron sources. The image-forming apparatus according to the present invention can be used in display devices for television broadcasting and the like, display devices of video conference systems, computers, etc., optical printers constructed with use of a photosensitive drum or the like, and so on.

2. Related Background Art

Conventionally, field emission type (FE type) electron-emitting devices configured to apply a strong electric field of not less than $10^6$ V/cm to metal and thereby emit electrons from the metal surface are drawing attention as one of cold electron sources.

If such FE type cold electron sources become practically available, it will become feasible to construct low-profile emissive type image display devices and they will also contribute to reduction in power consumption and reduction in weight.

Known as an example of a vertical FE type is a device in which, as shown in FIG. 13, an emitter 135 is of the shape of a circular cone or a quadrangular pyramid formed from a substrate 131 approximately in the vertical direction; for example, one disclosed in C. A. Spindt, "Physical Properties of thin-film field emission cathodes with molybdenum cones," J. Appl. Phys., 47, 5248 (1976) or the like (hereinafter referred to as a Spindt type).

On the other hand, a lateral FE structure is shown in FIG. 14. In the figure, numeral 141 designates a substrate, 142 an emitter electrode, 143 an insulating layer, 145 an emitter, 146 an anode, and 147 a profile of an electron beam irradiating the anode. The emitter 145 sharp-pointed at the tip is arranged in parallel with a gate electrode 144 for extracting electrons from the emitter tip, on the substrate and the collector (anode electrode) is disposed above the substrate on which the gate electrode and the emitter electrode are placed (see U.S. Pat. No. 4,728,851, U.S. Pat. No. 4,904,895, and so on).

As an example of the electron-emitting devices using fibrous carbon, Japanese Patent Application Laid-Open No. 8-115652 discloses a configuration in which thermal decomposition is implemented in the presence of organic compound gas on fine particles of catalyst metal whereby fibrous carbon is deposited in a fine gap.

As electroconductive layers for carbon nanotubes, Japanese Patent Application Laid-Open No. 11-194134 and European Patent EP0913508A2 describe metal layers of titanium (Ti), zirconium (Zr), niobium (Nb), tantalum (Ta), and molybdenum (Mo). Japanese Patent Application Laid-Open No. 11-139815 describes Si as an electroconductive substrate.

The beam profiles of the electron-emitting devices according to the prior arts will be described referring to FIGS. 13 and 14.

In FIG. 13, which shows the Spindt type electron-emitting device according to the foregoing prior art, numeral 131 denotes the substrate, 132 the emitter electrode, 133 the insulating layer, 134 the gate, and 135 the emitter connected to the emitter electrode 132. When Vf is placed between the emitter 135 and the gate 134, the electric field becomes stronger at the tip of the projection of the emitter 135 and then electrons are emitted from the vicinity of the tip of the cone into the vacuum.

Since the electric field at the tip of the emitter is formed in such a certain finite area as to follow the shape of the emitter tip, the extracted electrons are drawn in the vertical direction relative to the potential from the finite area at the emitter tip.

At this time, electrons are also emitted at various angles. As a result, electrons with large angle components are drawn in directions toward the internal peripheral surface in the hole formed in the gate 134.

As a consequence, where the hole is circular, an electron distribution obtained on the anode 136 in the figure becomes a substantially circular beam profile 137. This indicates that the resultant beam profile is in close relation with the shape of the gate and the distance to the emitter.

The lateral FE configuration as shown in FIG. 14 is the prior art in which electrons are emitted in the aligned extraction direction.

In FIG. 14, numeral 141 designates the substrate, 142 the emitter electrode, 143 the insulating layer, 144 the gate, and 145 the emitter, and the anode 146 is provided on a substrate opposed to the substrate on which the emitter and gate are disposed.

In the case of the lateral FE configuration constructed in this way, some of electrons emitted from the emitter 145 are extracted (or emitted) into the vacuum, but the rest are taken into the gate 144.

In the configuration shown in FIG. 14, the direction of the electric field vector for emission of electrons (the electric field from the emitter 145 toward the gate 144) is different from the direction of the electric field vector toward the anode 146. As a result, the electron distribution (electron beam spot) becomes large.

SUMMARY OF THE INVENTION

The prior arts as described above had the following problems.

Since in the foregoing Spindt type the gate and the substrate were constructed in the layered structure, a large gate capacitance and a lot of parasitic capacitances to the emitter were made. Further, the driving voltage was as high as several ten volts, and there was the drawback of large capacitive power consumption because of the configuration. The Spindt type configuration also had the problem that the beam profile became expanded at the positive electrode (anode).

The foregoing lateral FE configuration had the advantage of capability of reducing the capacitance of the device but had the disadvantage of increasing the driving voltage, because the large distance between the emitter and the gate required several hundred volts for driving. This configuration also had the problem that the beam profile was expanded at the positive electrode (anode).

It is also conceivable to provide the above Spindt type and lateral FE type electron-emitting devices with a beam focusing means, but this raises problems of complexity in a fabrication method, increase in the device area, decrease in electron emission efficiency, and so on.

The present invention has been accomplished in order to solve the above problems and an object of the invention is to provide electron-emitting devices that are reduced in the device capacitance and the driving voltage and improved in the electron emission efficiency and that can provide a high-definition beam stably over a long period, and electron sources and image-forming apparatus using them.

In order to achieve the above object, an electron-emitting device according to the present invention comprises a first electrode and a second electrode arranged in opposition to each other with a gap between first and second electrodes on a surface of a substrate, and a plurality of fibers electrically connected to the first electrode and comprising carbon as a main component, and the fibers are placed on a surface of the first electrode facing the second electrode.

In order to achieve the above object, another electron-emitting device according to the present invention comprises an extraction electrode and a cathode electrode formed in opposition to each other with a gap between the extraction electrode and the negative electrode on an electrically insulating substrate, a first layer formed on the negative electrode and having an oxide of Ti, an oxide of Zr, or an oxide of Nb on a surface thereof, and a fibrous carbon grown through a catalyst particle disposed on a side wall surface of the first layer on the extraction electrode side.

An electron source according to the present invention is characterized by a plurality of above-stated electron-emitting devices arrayed.

An image-forming apparatus according to the present invention is characterized by use of the above electron source.

According to the present invention, it is feasible to provide the electron-emitting devices presenting a small electron beam spot on the anode, achieving excellent electron emission efficiency, and having excellent durability, a small capacitance component, and excellent stability. The electron sources using the electron-emitting devices can realize quick responsivity and low power consumption. The image-forming apparatus using the electron sources can provide high-definition images with high luminance over a long period, in addition to the quick responsivity and low power consumption.

DETAILED DESCRIPTION OF THE PREFERRED EMBODIMENTS

Figure 1A:
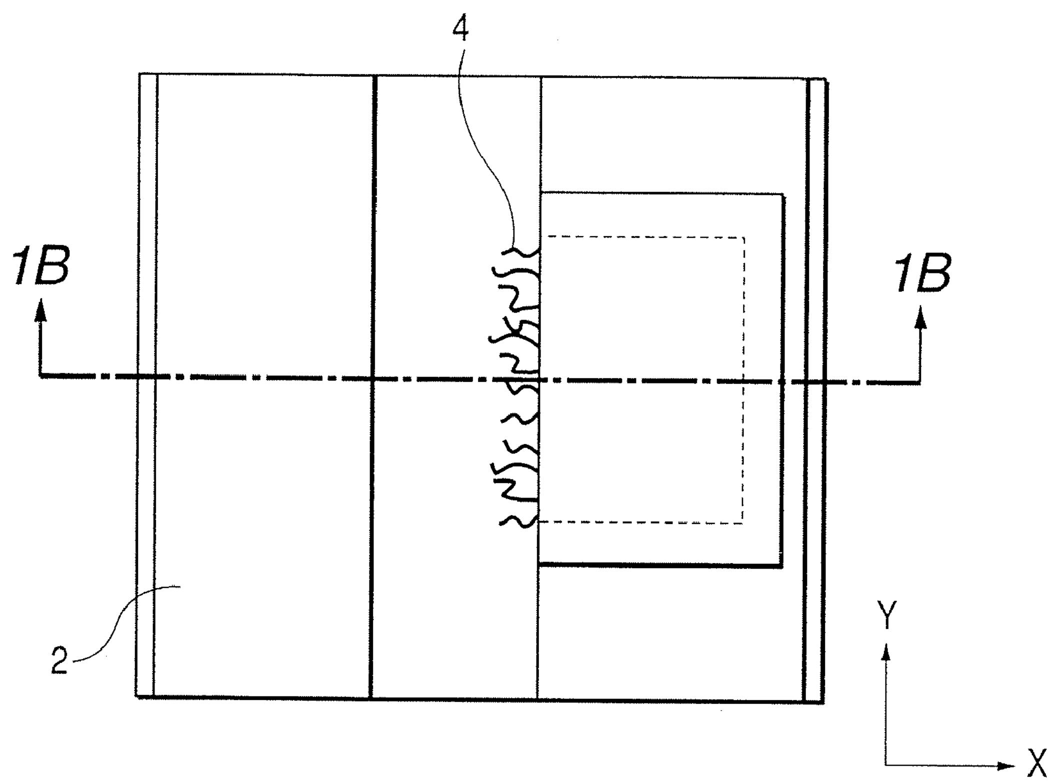
FIGS. 1A and 1B are schematic views showing an electron-emitting device according to an embodiment and Example 1 of the present invention.

The embodiments of the present invention will be illustratively described hereinafter in detail with reference to the drawings. It is, however, noted that, as to the dimensions, materials, shapes, relative locations, etc. of the components described in the embodiments, the scope of the invention is by no means intended to be limited only to those unless otherwise stated specifically.

The inventors conducted research on materials that permitted fine (several nm order) nuclei (catalyst particles) to be formed thereon from a catalyst and that formed stable electrical coupling with fibrous carbons grown from the nuclei by thermal decomposition.

From the research, the inventor found that preferable materials permitting the growth of the fibrous carbons through the catalyst and achieving electrical coupling therewith were materials selected from Ti, Zr, and Nb and oxidized in part (at the interface in contact with the fibrous carbons or the catalyst), or oxide semiconductors of materials selected from Ti, Zr, and Nb.

From detailed investigation, the inventor further found that the fibrous carbons were able to be produced at the position of the catalyst particles with good repeatability, by use of a member in which the catalyst particles (particularly preferably, Pd particles) were placed on an oxide of a material selected from Ti, Zr, and Nb.

In tandem with it, the inventor also found that materials on which no fibrous carbon grew or on which a growth rate of fibrous carbon was low, were Ta, Cr, Au, Ag, Pt, and materials of the same kinds as the catalyst materials.

The growth of the fibrous carbons over these materials is also valid in the layered structure. For example, Cr was deposited over the entire surface of a substrate, a fine region of titanium oxide was further formed on the Cr layer, and the entire surface of the substrate was coated with palladium oxide. With use of this substrate, the fibrous carbons were selectively grown only above titanium oxide.

Then the electron-emitting devices, electron sources, and image-forming apparatus using the fibrous carbons according to the present invention, using the technology of forming the fibrous carbons at a desired position with good repeatability as described above, will be described below in comparison with the prior art examples.

First, the inventors also conducted research about a method of forming a high-definition electron beam. The high-definition beam forming method will be described below.

In general, the operating voltage Vf of the FE device is determined by the electric field at the tip portion of the emitter, which is derived by the Poisson's equation, and the current density of electron emission current obtained according to a relation called the Fowler-Nordheim equation, using the electric field and a work function at the emitter portion as parameters.

As for the electric field necessary for the electron emission, the smaller the distance d between the emitter tip and the gate electrode, or the smaller the radius r of the emitter tip, the stronger the electric field is established.

Figure 13:
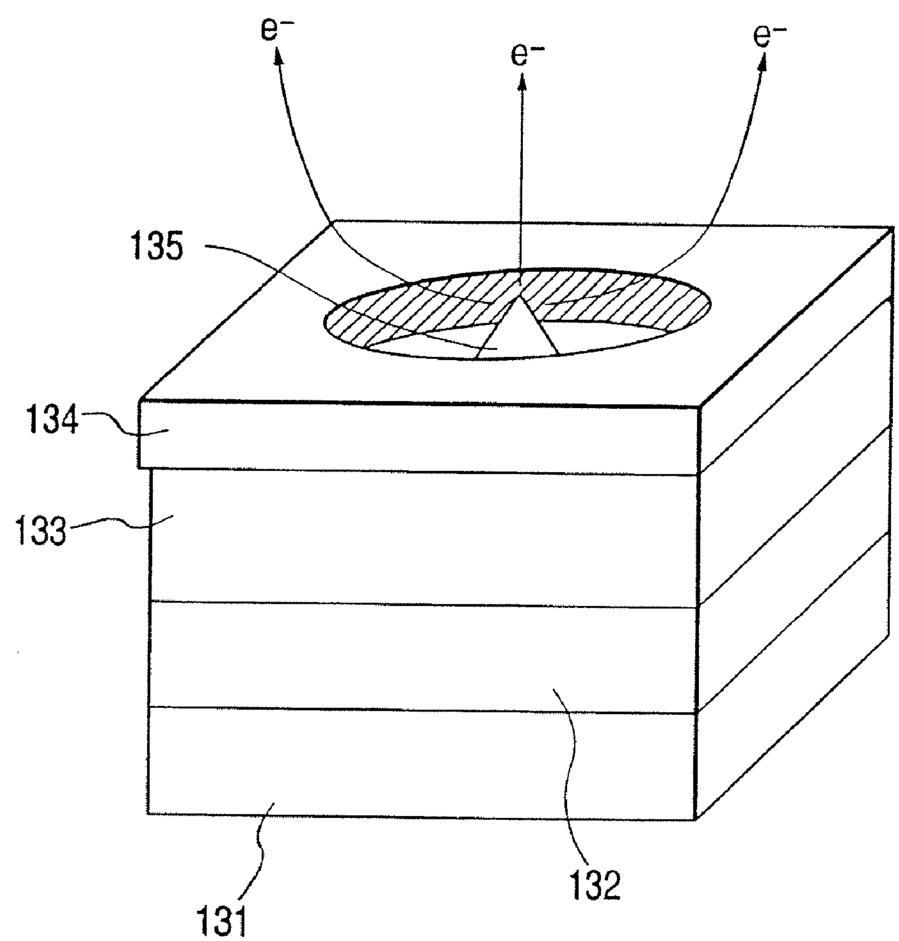
FIG. 13 is a schematic structure diagram of the vertical FE configuration according to the prior art.

On the other hand, the maximum X-directional size Xd of the electron beam on the anode (for example, the maximum range from the center of the circular beam profile 137 in FIG. 13) is expressed in the form proportional to $\sqrt{(Vf/Va)}$ in simple computation.

As apparent from this relation, increase in Vf results in increase in the beam size.

From this consideration, the distance d and radius r need to be set as small as possible in order to decrease Vf.

The beam profiles of the conventional configurations will be described below using FIGS. 13 and 14. In the figures, numerals common thereto denote as follows: 131, 141 the substrate; 132, 142 the emitter electrode; 133, 143 the insulating layer; 135, 145 the emitter; 136, 146 the anode; 137, 147 the shape of the electron beam irradiating the anode.

In the case of the foregoing Spindt type, as shown in FIG. 13, when Vf is applied between the emitter 135 and the gate 134, the electric field becomes stronger at the tip of the projection of the emitter 135, and electrons are taken out from near the tip of the conical emitter into the vacuum.

Since the electric field at the tip of the emitter 135 is formed in such a certain finite area as to follow the shape of the tip of the emitter 135, electrons extracted are drawn in the vertical direction relative to the potential from the finite area of the tip of the emitter 135.

At this time, electrons are emitted at various angles and electrons with large angle components are drawn in directions toward the gate. When the gate 134 is circular, the electron distribution on the anode 136 becomes the substantially circular beam profile 137 as shown in the figure.

Namely, the resultant beam profile is in close relation with the shape of the extraction gate and the distance to the emitter.

In the case of the lateral FE configuration (FIG. 14) wherein electrons are extracted in the aligned extraction direction, the very strong electric field (lateral electric field) is created substantially in parallel to the surface of the substrate 141 between the emitter 145 and the gate 144, so that among electrons emitted from the emitter 145, some electrons 149 are drawn into the vacuum and the remaining electrons are taken into the gate electrode 144.

Figure 14:
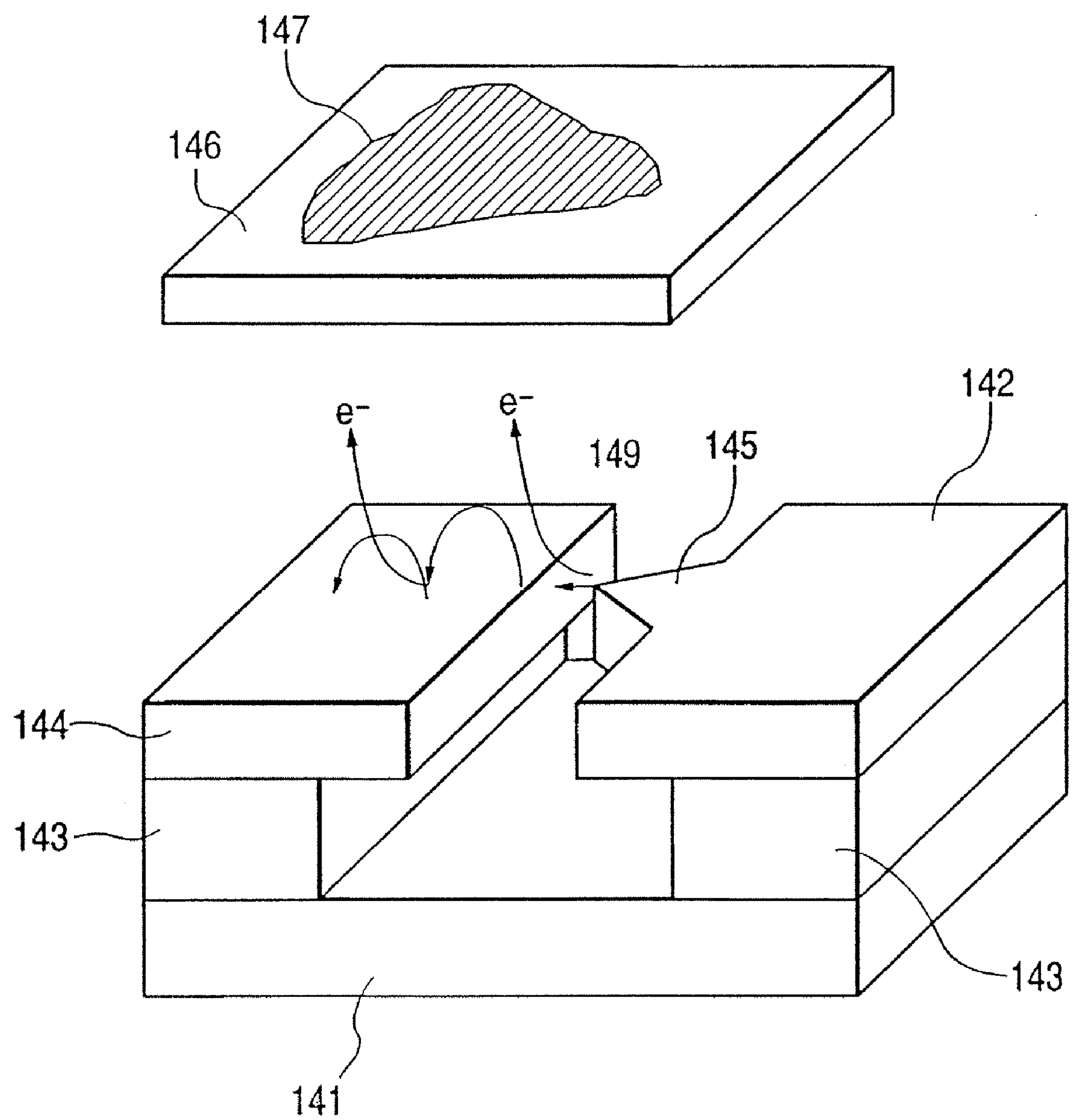
FIG. 14 is a schematic structure diagram of the lateral FE configuration according to the prior art.

In the case of the configuration shown in this FIG. 14, the direction of the electric field vector for the emission of electrons (the electric field directed from the emitter 145 toward the gate 144) is different from the direction of the electric field vector directed toward the anode (anode electrode) 146. For this reason, the emitted electrons form a large electron distribution (beam spot) on the anode 146.

Here let us further consider the electric field for extracting electrons from the emitter electrode 145 (which will be called a "lateral electric field" herein for convenience' sake and the enhancement effect of the electric field by the emitter shape will be ignored herein) and the electric field directed toward the anode (which will be called a "vertical electric field" herein).

In the configurations of FIG. 13 and FIG. 14, the foregoing "lateral electric field" can also be referred to as an "electric field in the substantially parallel direction to the surface of the substrate 131 (141)". Particularly, in the configuration of FIG. 14, it can also be referred to as an "electric field in the facing direction of the gate 144 and the emitter 145".

In the configurations of FIG. 13 and FIG. 14, the foregoing "vertical electric field" can also be referred to as an "electric field in the substantially normal direction to the surface of the substrate 131 (141)" or as an "electric field in the facing direction of the substrate 131 (141) and the anode 136 (146)".

As described previously, electrons emitted from the emitter 145 are first drawn by the lateral electric field to fly toward the gate 144 and thereafter they are moved up by the vertical electric field to reach the anode 146.

Important points at this time are a ratio of strengths of the lateral electric field and the vertical electric field and the relative position of electron emission point.

When the lateral electric field is stronger in order of magnitude than the vertical electric field, most of the electrons emitted from the emitter fly in trajectories gradually bent by radial potentials formed by the lateral electric field and directed toward the gate. Part of the electrons colliding with the gate are again emitted because of scattering, and thereafter are repeatedly scattered as spreading on the gate while drawing trajectories similar to ellipses many times and as reducing the number of emitted electrons, before they are captured by the vertical electric field. When the scattered electrons then cross an equipotential line made by the gate potential (which is also called a "stagnation point"), they are moved up by the vertical electric field for the first time.

When the lateral electric field and the vertical electric field are approximately equal in strength to each other, the extracted electrons also fly in trajectories bent by the radial potentials, but the binding by the electric field becomes weaker, so that there appear trajectories of electrons captured by the vertical electric field without colliding with the gate 144.

It was verified that with the lateral electric field and vertical electric field approximately equal in strength to each other, as the position of the electron emission point from the emitter 145 was gradually lifted up from the plane to which the gate 144 belonged, toward the plane to which the anode 146 belonged (see FIG. 6), the emitted electrons could fly in trajectories captured by the vertical electric field without colliding with the gate 144 at all.

Research was conducted about the electric field ratios and it was found from the research that, where d represented the spacing between the gate electrode 144 and the tip of the emitter electrode 145, V1 the potential difference (the potential difference between the gate electrode and the emitter electrode) during driving of the device, H the distance between the positive electrode (anode) and the substrate (device), and V2 (Va) the potential difference between the positive electrode (anode) and the negative electrode (emitter electrode), the extracted electrons drew the trajectories colliding with the gate when the lateral electric field was 50 or more times stronger than the vertical electric field.

The inventor also discovered that there existed a height s causing no substantial scattering on the gate electrode 2 (which is defined by a distance between a plane including part of the surface of the gate electrode 2 and being substantially parallel to the surface of the substrate 1 and a plane including the surface of the electron-emitting member 4 and being substantially parallel to the surface of the substrate 1 (see FIG. 6)). This height s is dependent upon the ratio of the vertical electric field and the lateral electric field (strength of the vertical electric field/strength of the lateral electric field) and the height becomes lower with decrease in the vertical-lateral electric field ratio and becomes higher with increase in the lateral electric field.

A practical fabrication range of the height s is not less than 10 nm nor more than 10 μm.

In the conventional configuration shown in FIG. 14, since the gate 144 and the emitter (142, 145) were formed at the same height on the same plane and since the lateral electric field was stronger by one or more figures than the vertical electric field, there was the strong tendency that the number of extracted electrons into the vacuum decreased because of the collision with the gate.

Further, in the conventional configuration, since the thickness and width of the gate electrode and the relative positions of the gate, emitter, and anode were determined for the purpose of enhancing the intensity of the lateral electric field, the electron distribution on the anode became expanded.

As described previously, in order to make small the distribution of electrons reaching the anode 146, it is necessary to consider 1) decreasing the driving voltage (Vf), 2) aligning the extraction directions of electrons, 3) trajectories of electrons, and, further, in the case involving the scattering on the gate, 4) the scattering mechanisms of electrons (particularly, elastic scattering).

The electron-emitting devices using the fibrous carbons according to the present invention realize both the size reduction of the electron distribution on the anode electrode and improvement in the electron emission efficiency (decrease of emitted electrons absorbed by the gate electrode).

Figure 1B:
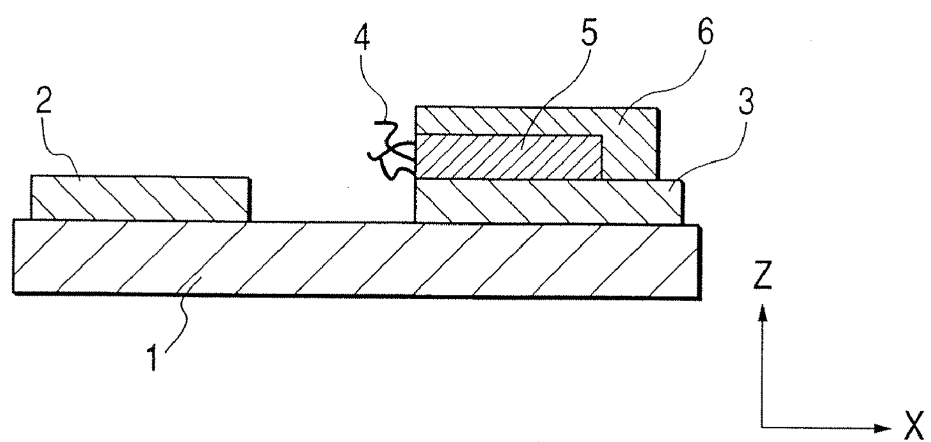
Figure 6:
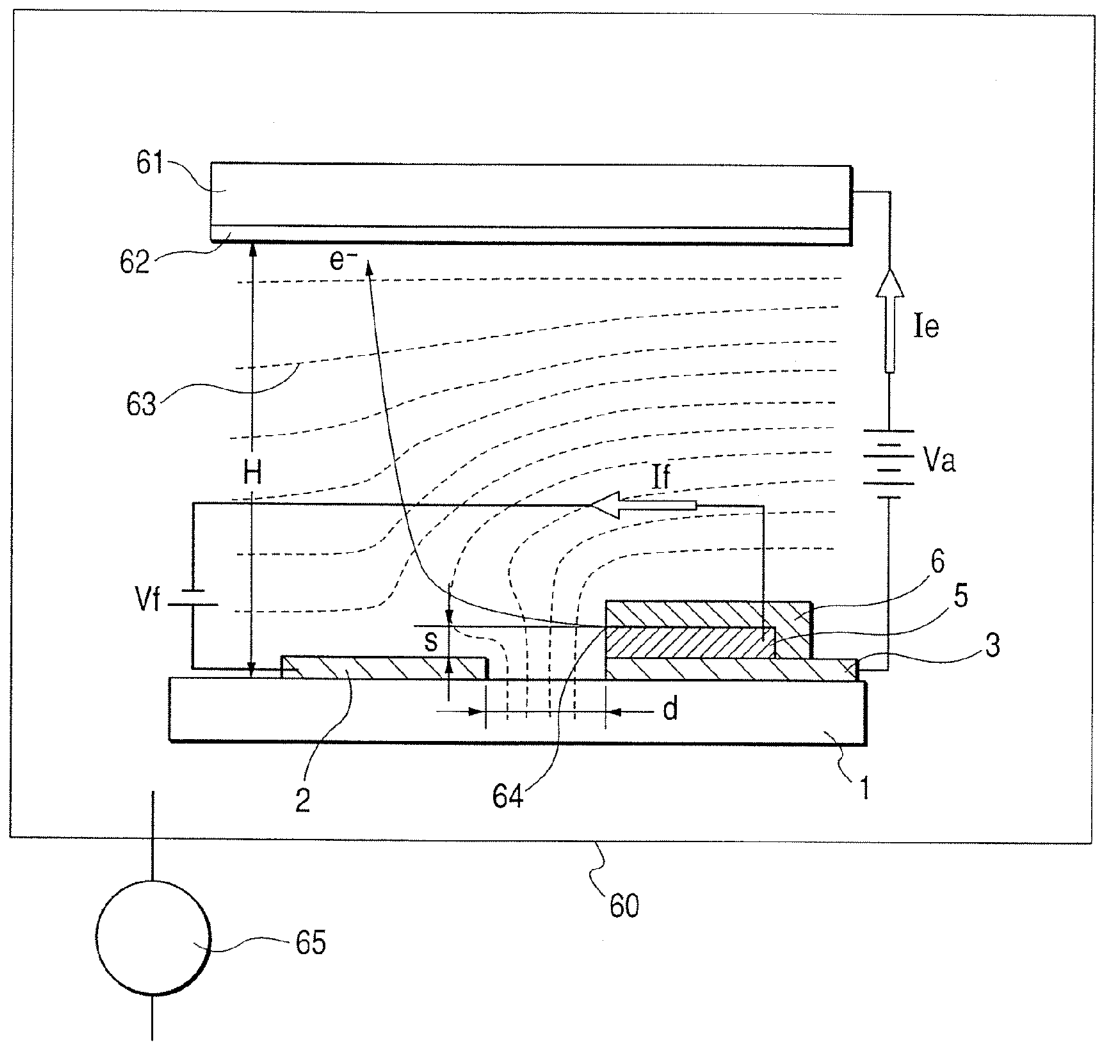
FIG. 6 is a diagram for explaining the operation of the electron-emitting device.

Configurations of the electron-emitting devices according to the present invention will be described below in further detail with reference to the drawings. FIGS. 1A and 1B are schematic views showing an example of the electron-emitting device according to the present invention, wherein FIG. 1A is a plan view thereof and FIG. 1B a cross-sectional view along 1B-1B in FIG. 1A. FIG. 6 is a schematic cross-sectional view showing a state of driving of the electron-emitting apparatus according to the present invention in which the anode electrode is placed above the electron-emitting device of the present invention.

In FIGS. 1A and 1B and FIG. 6, numeral 1 designates an electrically insulating substrate, 2 an extraction electrode (also called "gate electrode" or "second electrode"), 3 a negative electrode (also called "first electrode" or "cathode electrode"), 4 fibrous carbons being an emitter material (also called "electron-emitting material" or "electron-emitting member"), and 5 a first layer for selective growth of the fibrous carbons, which is an oxide of a material selected from Ti, Zr, and Nb, described previously. The fibrous carbons constituting the electron-emitting material 4 are electrically connected to the electrode 3. Numeral 6 denotes a second layer.

In the present invention, the important structure is that the negative electrode 3 and the extraction electrode 2 are placed with a gap in between on the surface of the substrate and a plurality of fibrous carbons 4 are placed on a surface of the negative electrode 3 facing the extraction electrode 2. In other words, the plurality of fibrous carbons extending in the facing direction of the negative electrode 3 and the extraction electrode 2 are located on the negative electrode 3 in the gap between the negative electrode 3 and the extraction electrode 2. This configuration permits electrons to be emitted by a lower electric field.

Further, in the present invention, the important structure is that, in order to prevent unnecessary electrons from being emitted, the fibrous carbons are not placed on the surfaces except for the surface facing the extraction electrode 2. This structure can restrain the expansion of the electron beam irradiating the anode electrode.

In the example of FIGS. 1A, 1B, the first layer 5 and the second layer 6 are provided for controlling the region where the fibrous carbons are formed. Namely, the first layer 5 is made of a material permitting the fibrous carbons 4 to grow thereon, while the second layer 6 is made of a material not permitting the fibrous carbons 4 to grow thereon, as compared with the first layer 5. The first layer and second layer described above are preferably electrically conductive. Particularly, the second layer is especially preferably electrically conductive, because it is exposed in vacuum. In the configuration as shown in FIGS. 1A, 1B, unless the first layer 5 is electrically conductive, electrical connection cannot be established between the negative electrode 3 and the fibrous carbons; therefore, the first layer 5 is preferably selected from electroconductive materials.

The example with provision of the second layer 6 was described herein, but this layer does not always have to be provided. For example, it is also possible to construct an electron-emitting device of the present invention by making the negative electrode 3 of a material selected from Ti, Zr, and Nb and oxidizing only a surface thereof facing the extraction electrode 2 among its surfaces (i.e., by placing the first layer).

In the form shown in FIGS. 1A, 1B, all the first layer 5 does not have to be made of an oxide, but it is also possible to make at least only the surface facing to the extraction electrode 2 among the surfaces of the first layer 5, of an oxide. This structure makes the second layer not always necessary. Even if the first layer is thick, such structure can enhance the electrical connection between the negative electrode 3 and the fibrous carbons.

The electron-emitting device according to the present invention can also be constructed in such a way that the negative electrode 3 is made of a material. selected from Ti, Zr, and Nb, the surface thereof (including the surface facing the extraction electrode. 2) is oxidized, and the surfaces other than the surface facing the extraction electrode 2 (i.e., the surface on which the fibrous carbons are laid) are coated with a layer (the second layer) made of a material permitting no growth of fibrous carbons as compared with the oxide of the material selected from Ti, Zr, and Nb.

In the electron-emitting apparatus of the present invention, as shown in FIGS. 1A, 1B and FIG. 6, the plane including the surface of the electron-emitting member 4 and being substantially parallel to the surface of the substrate 1 is preferably more distant from the surface of the substrate than the plane including part of the surface of the gate electrode 2 and being substantially parallel to the surface of the substrate 1. In other words, in the electron-emitting apparatus of the present invention, the plane including part of the surface of the electron-emitting member 4 and being substantially parallel to the surface of the substrate 1 is located between the anode electrode 61 and the plane including part of the surface of the extraction electrode 2 and being substantially parallel to the surface of the substrate. This structure can realize the reduction of electrons absorbed into the gate electrode and the reduction of the spot size of the electron beam impinging on the anode electrode.

Further, in the electron-emitting device of the present invention, the electron-emitting member 4 is located at the height s (defined as the distance between the plane including part of the surface of the gate electrode 2 and being substantially parallel to the surface of the substrate 1 and the plane including the surface of the electron-emitting member 4 and being substantially parallel to the surface of the substrate 1) at which no substantial scattering of electrons occurs on the gate electrode 2.

The above height s is dependent upon the ratio of the vertical electric field and the lateral electric field (intensity of the vertical electric field/intensity of the lateral electric field), and the height needs to be decreased with decrease in the ratio of the vertical electric field and the lateral electric field and to be increased with increase in the intensity of the lateral electric field; the practical range of the height s is not less than 10 nm nor more than 10 μm.

This structure can be readily realized, for example, by making the thickness of the negative electrode 3 larger than the thickness of the extraction electrode 2. Alternatively, it can also be realized by forming the negative electrode 3 and the extraction electrode 2 in equivalent thickness and placing the first layer 5 on the negative electrode 3.

In the electron-emitting apparatus of the present invention, where, in the structure shown in FIG. 6, d represents the distance of the gap between the negative electrode 3 and the gate electrode 2, Vf the potential difference during driving of the electron-emitting device (the voltage between the negative electrode 3 and the gate electrode 2), H the distance between the anode electrode 61 and the surface of the substrate 1 on which the device is placed, and Va the potential difference between the anode electrode 61 and the negative electrode 3, the electric field (lateral electric field) during the driving: $E1=Vf/d$ is set to be not less than 1 times nor more than 50 times stronger than the electric field (vertical electric field) between the anode 61 and the cathode 3: $E2=Va/H$.

This setting can almost nullify the ratio of electrons colliding with the gate electrode 2 to electrons emitted from the negative electrode 3. As a result, there are provided the electron-emitting device and the electron-emitting apparatus with the extremely small spread of the emitted electron beam and with high electron emission efficiency.

The "lateral electric field" stated in the present invention can be referred to as the "electric field in the direction substantially parallel to the surface of the substrate 1". In another sense, it can also be referred to as the "electric field in the facing direction of the gate 2 and the cathode electrode 3". The "vertical electric field" stated in the present invention can be referred to as the "electric field in the direction substantially normal to the surface of the substrate 1" or the "electric field in the facing direction of the substrate 1 and the anode electrode 61".

The electrically insulating substrate 1 can be either of laminations in which $SiO_2$ is laid by sputtering or the like on a well-cleaned surface of either of silica glass, glasses partly replaced with K or the like while reducing the impurity content of Na and others, soda lime glass, silicon substrates, etc. insulating substrates of ceramics such as alumina or the like, and so on.

The extraction electrode 2 and the negative electrode 3 are electrically conductive and are made by either of the ordinary vacuum film-forming technologies such as vacuum evaporation, sputtering, and the like, or the photolithography technology.

The materials of the extraction electrode 2 and the negative electrode 3 are adequately selected, for example, from carbon, metals, nitrides of metals, carbides of metals, borides of metals, semiconductors, and metal semiconductors coumpounds.

The thicknesses of the extraction electrode 2 and the negative electrode 3 are set in the range of several ten nm to several ten pm. Preferably, they are desirably made of either of heat resistant materials such as carbon, metals, nitrides of metals, and carbides of metals.

When there is a worry that a potential drop or the like can occur because of the small thickness of the electrodes or when such devices are used in a matrix array, a low-resistant metal material for wiring is sometimes used in portions not associated with the emission of electrons as occasion may demand.

In comparison of electric field intensities between the electron emission field of the cathode material used (the lateral electric field) and the vertical electric field necessary for the formation of image, the gap between the extraction electrode 2 and the negative electrode 3 (the width of the gap) and the driving voltage are preferably designed so that the electron emission field becomes approximately 1 times to 50 times stronger than the vertical electric field.

In the present invention, the emitter (electron-emitting member) 4 is comprised of fibrous carbons.

The fibrous carbons are preferably those obtained by forming nuclei with use of a catalyst and growing the fibrous carbons from the nuclei by thermal decomposition.

According to the present invention, the "fibrous carbons" can also be said as "columnar substances comprising carbon as a main component" or "linear substances comprising carbon as a main component". The "fibrous carbons" can also be mentioned as "fibers comprising carbon as a main component". More specifically, the "fibrous carbons" in the present invention embrace carbon nanotubes, graphite nanofibers, and amorphous carbon fibers. Among these, the graphite nanofibers are most preferable for the electron-emitting member 4.

The gap between the extraction electrode 2 and the negative electrode 3 and the driving voltage are preferably designed so that, in comparison of electric field intensities between the electron emission field of the electron-emitting member (the lateral electric field) and the vertical electric field necessary for the formation of image, the electron emission field becomes approximately 1 times to 50 times stronger than the vertical electric field, as described previously.

When a light emitting member such as a phosphor or the like is placed on the positive electrode (anode electrode), the necessary vertical field is preferably in the range of not less than $10^{-1}$ V/μm nor more than 10 V/μm. For example, where the gap between the positive electrode (anode electrode) and the negative electrode is 2 mm and 10 kV is placed in the gap, the vertical electric field at this time is 5 V/μm. In this case, the emitter material (electron-emitting member) 4 to be used is one having the electron emission field larger than 5 V/μm, and the spacing and driving voltage can be determined so as to realize the selected electron emission field.

The aforementioned fibrous carbons are preferably applicable as materials having the threshold electric field of several V/μm as described above.

Figure 11:
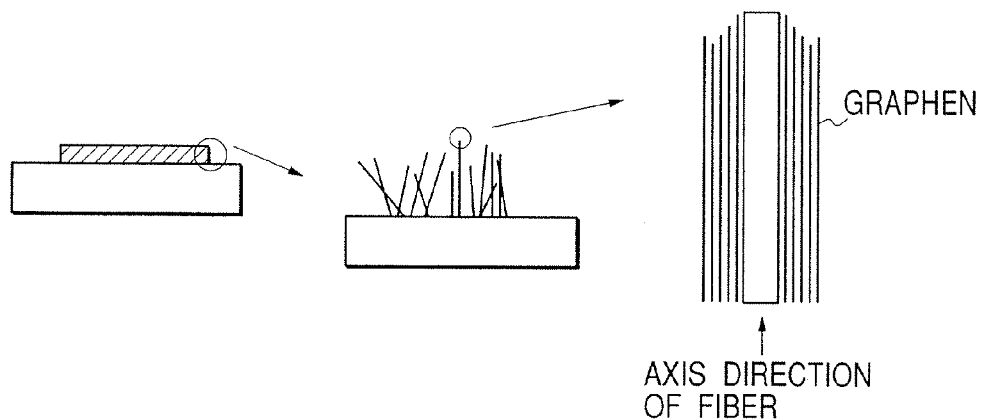
FIG. 11 is a schematic structure diagram of fibrous carbons (carbon nanotubes)
Figure 12:
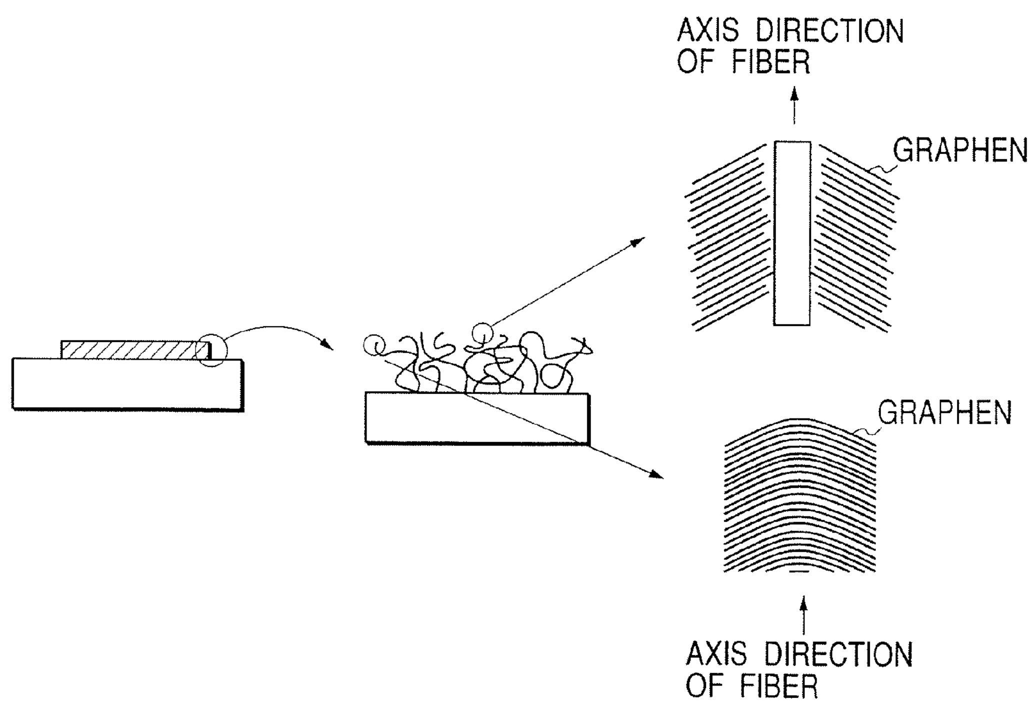
FIG. 12 is a schematic structure diagram of fibrous carbons (graphite nanofibers)

FIG. 11 and FIG. 12 show examples of forms of the fibrous carbons suitably applicable to the present invention. In each figure the left view schematically shows a form observed at the optical microscope level (approximately 1000×), the center view a form observed at the scanning electron microscope (SEM) level (approximately 30,000×), and the right view a form of carbon observed at the transmission electron microscope (TEM) level (approximately 1 million×).

As shown in FIG. 11, the form of cylindrical shape of graphen is called a carbon nanotube (a multiple structure of cylinders is called a multiwall nanotube), and the threshold thereof becomes the lowest, particularly, in the structure in which the tube is open at the tip.

As another example, fibrous carbons may be produced at relatively low temperatures are shown in FIG. 12. A fibrous carbon of this form is comprised of a lamination of graphens (which is thus sometimes called "graphite nanofiber" and the rate of amorphous structure of which increases depending upon the temperature). More specifically, the graphite nanofiber indicates a fibrous substance in which graphens are layered (laminated) in the longitudinal direction thereof (in the axis direction of the fiber). In other words, as shown in FIG.

12, it is a fibrous substance in which a plurality of graphens are arranged and layered (laminated) so as not to be parallel to the axis of fiber.

On the other hand, a carbon nanotube is a fibrous substance in which graphens are arranged (in cylindrical shape) around the longitudinal direction (the axis direction of fiber). In other words, it is a fibrous substance in which graphens are arranged substantially in parallel to the axis of the fiber.

A single surface of graphite will be called a “graphen” or “graphen sheet”. More specifically, graphite is a lamination in which carbon planes, each of which is a spread of regular hexagons consisting of covalent bonds of carbon atoms in $sp^2$ hybrid, are layered at intervals of distance of 3.354 Å. Each of the carbon planes is called a “graphen” or “graphen sheet”.

All the fibrous carbons have the threshold for the emission of electron in the range of approximately 1 to 10 V/μm and are very suitable for the emitter (electron-emitting member) 4 of the present invention.

Particularly, the electron-emitting devices using the graphite nanofibers can be those capable of emitting electrons at a low electric field and yielding a large emission current, capable of being produced readily, and exhibiting stable electron emission characteristics, without having to be limited to the device structure of the present invention shown in FIGS. 1A, 1B and others. For example, an electron-emitting device can be constructed by making the emitter of graphite nanofibers and preparing the electrode for control of electron emission from this emitter, and a light emitting apparatus such as a lamp or the like can also be formed by using a light emitting member which emits light under irradiation of electrons emitted from the graphite nanofibers. Further, it is also possible to construct an image display apparatus such as a display or the like by arraying a plurality of such electron-emitting devices using the graphite nanofibers and preparing an anode electrode having a light emitting member such as a phosphor or the like. In the electron-emitting apparatus, the light emitting apparatus, and the image display apparatus using the graphite nanofibers, stable electron emission can be implemented without need for maintaining the interior in such an ultrahigh vacuum as required in the conventional electron-emitting devices, and a high electron emission amount can be ensured at a low electric field; therefore, the apparatus can be fabricated extremely simply with high reliability.

The aforementioned fibrous carbons can be made by decomposing a hydrocarbon gas under use of a catalyst (a material for promoting deposition of carbon). The carbon nanotubes and graphite nanofibers differ depending upon the type of the catalyst and the temperature of decomposition.

The catalyst materials, such as Fe, Co, Pd, Ni and alloy of material selected from those materials can be used as the nuclei for formation of the fibrous carbons.

Particularly, in the case of Pd, the graphite nanofibers can be produced at low temperatures (temperatures of not less than 400° C.). On the other hand, when the catalyst is Fe or Co, the temperature for production of carbon nanotubes needs to be not less than 800° C. Since the production of the graphite nanofiber material using Pd can be implemented at low temperatures, it is also preferable in terms of influence on the other members and the production cost.

Further, in the case of the Pd catalyst, using the property that the oxide thereof is readily reduced by hydrogen at low temperatures (room temperature), it is feasible to use palladium oxide as a nucleation material.

By employing the hydrogen reduction treatment of palladium oxide, it became feasible to form the initial aggregated nuclei at relatively low temperatures (200° C. or less) without use of thermal aggregation of metal thin film or production and evaporation of ultrafine particles accompanied by a danger of explosion which are conventionally used as ordinary nucleation techniques.

The foregoing hydrocarbon gas can be, for example, either of hydrocarbon gases such as ethylene, methane, propane, propylene, and so on, or vapors of organic solvents such as ethanol, acetone, and so on.

The raw materials for the fibrous carbons can also be such raw materials as CO, $CO_2$, and the like, in addition to the foregoing hydrocarbon gases.

The material of the layer 5 allowing the growth of fibrous carbons 4 is a mixture of Ti and an oxide thereof resulting from partial oxidation of Ti, or an oxide semiconductor of Ti; or a mixture of Zr and an oxide thereof resulting from partial oxidation of Zr, or an oxide semiconductor of Zr; or a mixture of Nb and an oxide thereof resulting from partial oxidation of Nb, or an oxide semiconductor of Nb, as described previously. The foregoing oxide of Ti, oxide of Zr, or oxide of Nb is placed at least on the surface for the fibrous carbons 4 to be placed, among the surfaces of the layer 5.

These oxides of Ti, Zr, and Nb are stoichiometrically insulators, but weakly oxidized substances thereof or suboxides thereof possess a number of defects inside and thus form semiconductors of the oxygen deficient type or the like.

The layer 5 and the catalyst particles placed on the layer 5 can be produced, for example, by a method of baking Pd on the layer of Ti, Zr, or Nb at the temperature of about 300° C. for about several ten minutes to form palladium oxide and simultaneously oxidizing the layer of Ti, Zr, or Nb as well. The baking temperature and time of this level, however, do not oxidize the entire layer, though depending upon the thickness of the layer of Ti, Zr, or Nb, but oxidize only the surface. Since such oxide has the semiconductor like nature as described above, the layer 5 thus formed results in possessing electrical conductivity.

The second layer 6 is comprised of a material on which no substantial growth of fibrous carbon occurs, as compared with the first layer 5, even if the catalyst particles are placed thereon. Such materials can be aforementioned Ta, Cr, Au, Ag, Pt, or materials of the same kinds as the catalyst materials. Then the region except for the side face of the first layer 5 on the extraction electrode 2 side is covered by the second layer 6.

As a result, only the side wall of the layer 5 on the extraction electrode 2 side is exposed, and thus the fibrous carbons 4 grow only on the side wall on the extraction electrode 2 side in the subsequent step of growth of fibrous carbons.

If the device should not have the conductive layer 6 on which the fibrous carbons do not grow through the fine catalyst particles, the fibrous carbons would grow over the entire surface of the conductive layer 5 on which the fibrous carbons can grow through the fine catalyst particles. In this case, the fibrous carbons apart from the gate electrode 2 would be involved in emission of electrons, though it is a little, and such electrons could disturb the beam profile and uniformity.

In contrast with it, the electron-emitting device according to the present embodiment can be constructed in the configuration wherein there exists no fibrous carbons on the side walls except for the side wall on the extraction electrode 2 side, and it is thus feasible to prevent the disturbance of the beam profile and uniformity.

The position of the electron emission point in the emitter region and the operation thereof will be described below referring to FIG. 6 and FIG. 7.

The instant device having the gap length d of several μm was placed in a vacuum chamber 60, as shown in FIG. 6, and then the interior thereof was evacuated well down to about $10^{-4}$ Pa by an vacuum pump 65. While the positive electrode (hereinafter referred to as an anode) 61 was set at the position of the height H of several millimeters from the substrate 1, a high voltage Va of several kV was applied from a voltage source.

A fluorescent member 62 with an electroconductive film coating thereon was placed on the anode 61.

A pulse voltage of about several ten V was applied as the driving voltage Vf between the electrode 2 and the electrode 3 to measure the device current If and electron emission current Ie. Naturally, the driving voltage Vf was applied so that the potential at the gate electrode 2 was higher than that at the negative electrode 3.

At this time, equipotential lines 63 are formed as shown, and the electric field is most concentrated at the part indicated by point 64 closest to the anode 61 among the fibrous carbons 4 of the electron-emitting material and inside the gap.

It is speculated that electrons are emitted from the site where the electric field is most concentrated in the electron-emitting material located in the vicinity of this field concentrating point 64.

Figure 7:
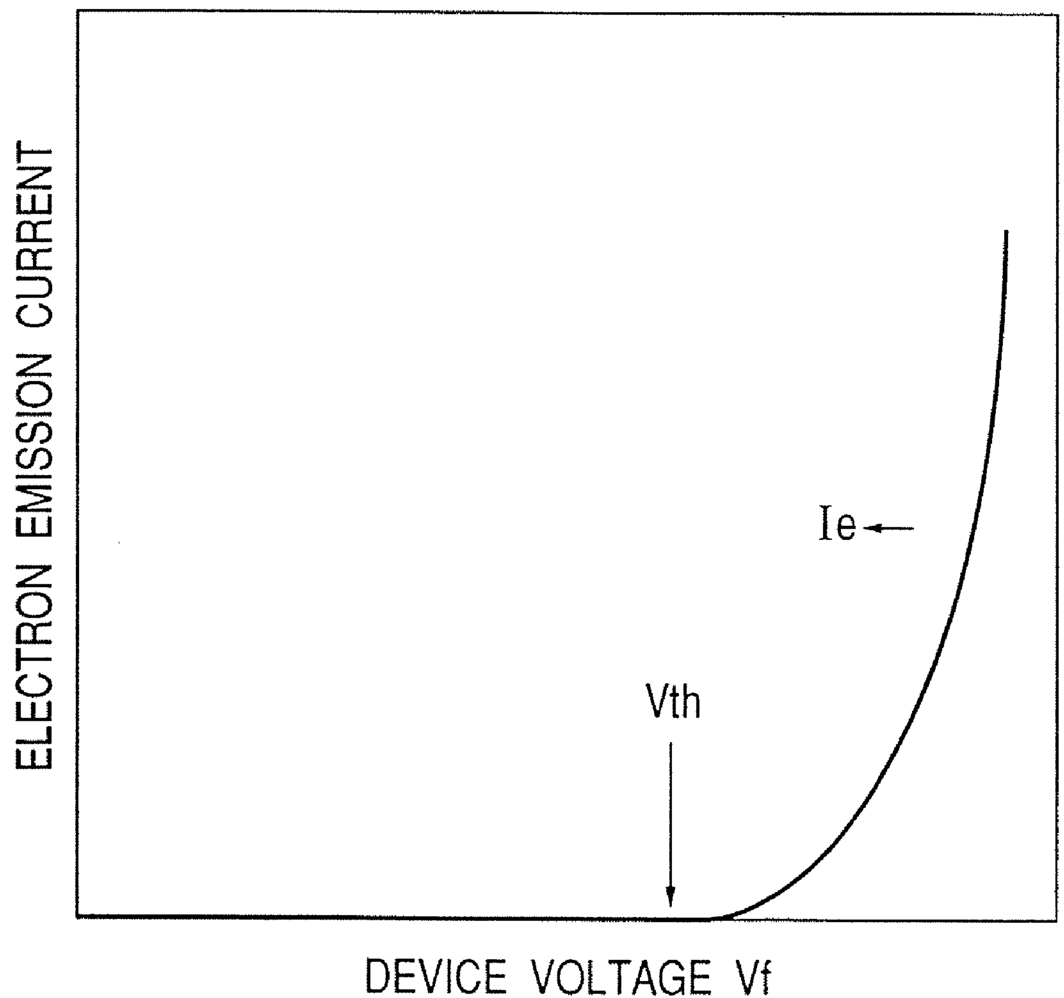
FIG. 7 is a characteristic diagram of the fundamental operation of the electron-emitting device.

The Ie characteristic of the device was that shown in FIG. 7. Namely, Ie demonstrated a sudden rise from about half of the applied voltage, and If, not shown, was similar to the characteristic of Ie but considerably smaller than Ie.

Figure 8:
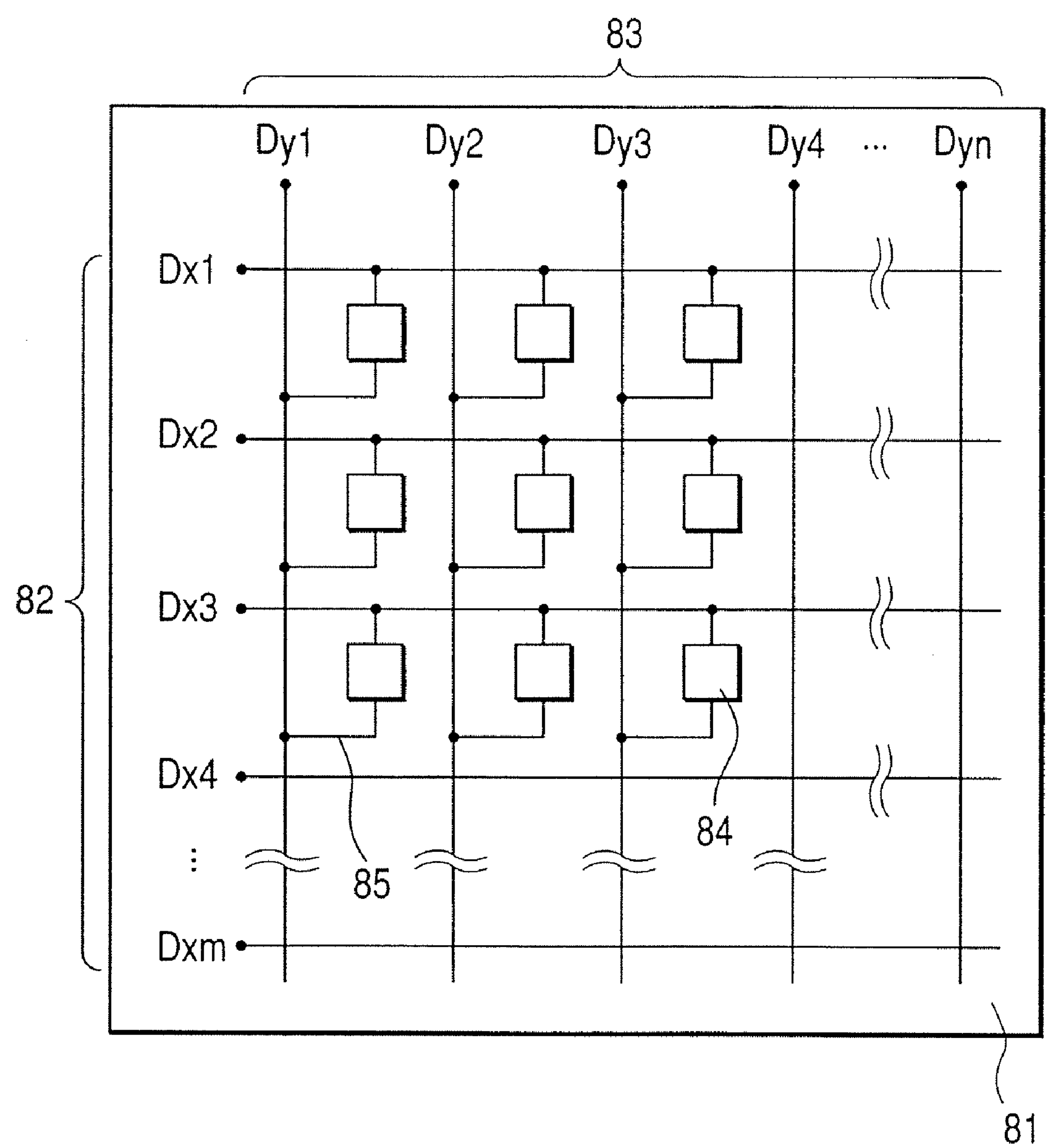
FIG. 8 is a schematic plan view of an electron source according to an embodiment of the present invention.

Based on this principle, an electron source and an image-forming apparatus comprised of a plurality of electron-emitting devices according to the embodiment of the present invention will be described hereinafter with reference to FIG. 8 to FIG. 10. FIG. 8 is a schematic plan view of electron source according to an embodiment of the present invention, FIG. 9 a perspective view of an image-forming apparatus, partly broken, according to an embodiment of the present invention, and FIG. 10 a block diagram of an image-forming apparatus according to an embodiment of the present invention.

In FIG. 8, numeral 81 denotes an electron source substrate, 82 X-directional wires, and 83 Y-directional wires. Numeral 84 denotes electron-emitting devices according to the embodiment of the present invention, and 85 interconnections.

In this configuration the placement of plural electron-emitting devices 84 is accompanied by increase in the capacitance of the devices, and there arises a problem that in the matrix wiring shown in FIG. 8, waves become dull because of the capacitance component, so as to fail to attain expected gradation even with application of short pulses according to pulse width modulation.

Figure 9:
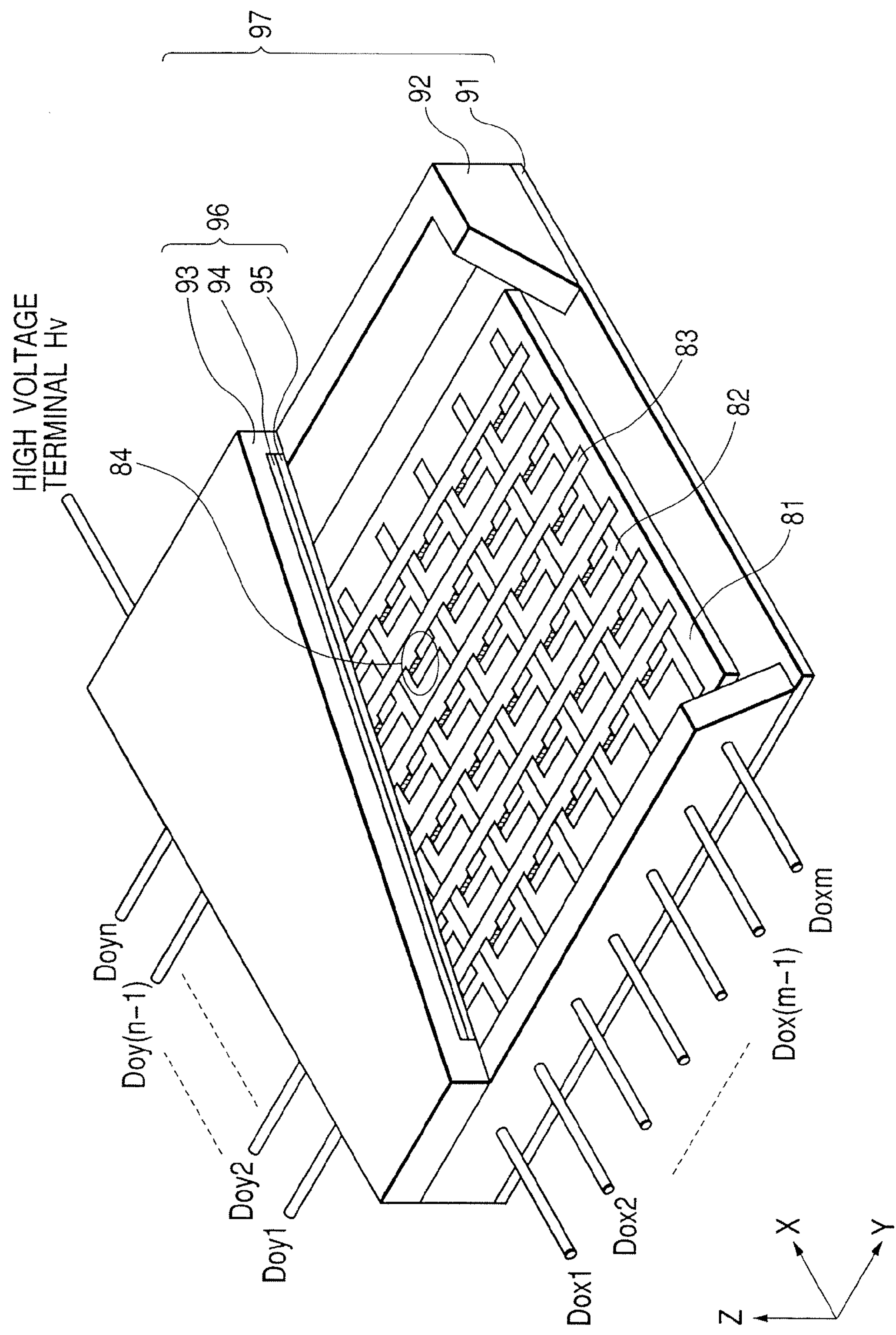
FIG. 9 is a perspective view of an image-forming apparatus, partly broken, according to an embodiment of the present invention.
Figure 10:
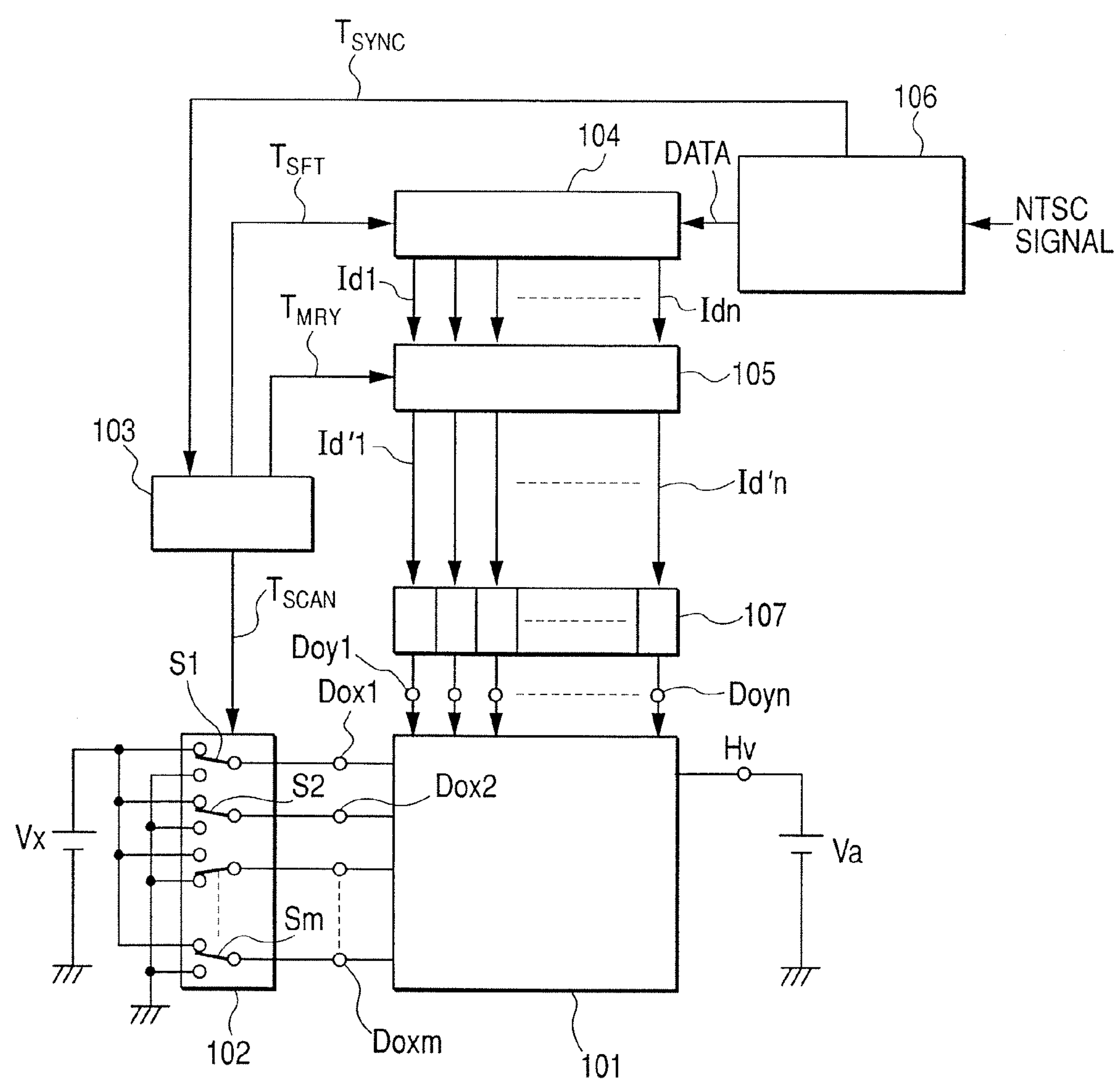
FIG. 10 is a block diagram of an image-forming apparatus according to an embodiment of the present invention.

In order to avoid it, it is preferable to employ a structure for reducing the increase of the capacitance component except for that in the electron emission section, for example, by placing an interlayer electric film (rear plate 91) right next to the electron emission section, as shown in FIG. 9.

In FIG. 8, the m X-directional wires 82 consist of $DX_1$, $DX_2$, . . . , $DX_m$ and are made of an aluminum based wiring material in the thickness of about 1 μm and in the width of 300 μm by evaporation. However, the material, thickness, and width of the wires are properly designed according to respective cases.

On the other hand, the Y-directional wires 83 consist of n wires of $DY_1$, $DY_2$, . . . , $DY_n$ 0.5 μm thick and 100 μm wide and are made in similar fashion to the X-directional wires 82.

An interlayer dielectric film not shown is disposed between these m X-directional wires 82 and n Y-directional wires 83, so as to electrically isolate them from each other (where m and n are positive integers).

The unrepresented interlayer dielectric film is made of $SiO_2$ in the thickness of about 0.8 μm by sputtering or the like.

The interlayer dielectric film is formed in the desired shape over the entire surface or in part of the substrate 81 after formation of the X-directional wires 82, and the thickness of the interlayer dielectric film is determined so that the device capacitance per device is not more than 1 pF and the device withstand voltage 30 V in the present embodiment, particularly, in order to resist the potential difference at intersections between the X-directional wires 82 and the Y-directional wires 83. The X-directional wires 82 and Y-directional wires 83 are drawn out as respective external terminals.

Pairs of electrodes (not shown) making up the electron-emitting devices 84 according to the embodiment of the present invention are electrically connected by the m X-directional wires 82, n Y-directional wires 83, and interconnections 85 of an electroconductive metal or the like.

Connected to the X-directional wires 82 is an unrepresented scanning signal applying means for applying a scanning signal for selection of a row of electron-emitting devices 84 according to the embodiment of the present invention, arrayed in the X-direction.

Connected to the Y-directional wires 83 on the other hand is an unrepresented modulation signal generating means for modulating each column of electron-emitting devices 84 according to the embodiment of the present invention, arrayed in the Y-direction, according to an input signal.

The driving voltage applied to each electron-emitting device is supplied as a difference signal between a scanning signal and a modulation signal applied to the device. In the embodiment of the present invention, electrical connection is established so that the Y-directional wires are at a higher potential while the X-directional wires at a lower potential. This connection yields the beam converging effect, which is a feature of the embodiment of the present invention.

In the above configuration, the individual devices can be selected to be driven independently by use of the simple matrix wiring.

An image-forming apparatus constructed by use of the electron source of this simple matrix configuration will be described referring to FIG. 9. FIG. 9 shows a display panel of the image-forming apparatus wherein soda lime glass is used as a material of a glass substrate.

In FIG. 9, numeral 81 designates an electron source substrate loaded with a plurality of electron-emitting devices, 91 a rear plate to which the electron source substrate 81 is fixed, and 96 a face plate wherein a florescent film 94, a metal back 95, etc. are formed on an internal surface of glass substrate 93. Numeral 92 denotes a support frame, and the rear plate 91 and face plate 96 are coupled to this support frame 92 with frit glass or the like. Numeral 97 represents an envelope which is sealed by baking it in the temperature range of 450° C. in vacuum for ten minutes.

Numeral 84 indicates the electron emission regions and numerals 82 and 83 denote the X-directional wires and Y-directional wires, respectively, which are connected to the pairs of device electrodes of the electron-emitting devices according to the embodiment of the present invention.

The envelope 97 is composed of the face plate 96, the support frame 92, and the rear plate 91, as described above. When an unrepresented support called a spacer is interposed between the face plate 96 and the rear plate 91, the envelope 97 can be constructed with sufficient strength against the atmospheric pressure.

The metal back 95 can be made in such a way that after production of the fluorescent film, the internal surface of the fluorescent film is subjected to a smoothing process (normally called "filming") and thereafter Al is deposited thereon by vacuum evaporation or the like.

The face plate 96 is further provided with a transparent electrode (not shown) on the outer surface side of the fluorescent film 94, in order to further enhance the electrical conductivity of the fluorescent film 94.

During the aforementioned sealing operation, in the color display case, correspondence has to be made between respective color phosphors and electron-emitting devices and thus sufficient alignment is essential.

Next, a scanning circuit 102 shown in FIG. 10 will be described below. This circuit is provided with M switching devices inside (schematically indicated by S1 to Sm in the figure). Each switching device selects either an output voltage of a dc voltage source Vx or 0 V (the ground level) to be electrically connected to a terminal Dx1 to Dxm of display panel 101.

Each switching device of S1 to Sm operates based on a control signal Tscan from a control circuit 103 and can be constructed, for example, of a combination of switching devices such as FETs.

The dc voltage source Vx is set to output such a constant voltage that the driving voltage applied to non-scanned devices is not more than the electron emission threshold voltage, based on the characteristics of the electron-emitting devices (electron emission threshold voltage) according to the embodiment of the invention, in the case of the present example.

The control circuit 103 has the function of matching operations of respective portions so as to implement appropriate display based on image signals supplied from the outside. The control circuit 103 generates control signals of Tscan, Tsft, and Tmry to the respective portions, based on a synchronizing signal Tsync supplied from a synchronizing signal separating circuit 106.

The synchronizing circuit 106 is a circuit for separating the synchronizing signal component and luminance signal component from a TV signal of the NTSC system supplied from the outside, and can be composed of an ordinary frequency separating (filter) circuit or the like.

Although the synchronizing signal separated by the synchronizing signal separating circuit 106 consists of a vertical synchronizing signal and a horizontal synchronizing signal, it is illustrated as a Tsync signal herein for convenience' sake of description. The luminance signal component of an image separated from the aforementioned TV signal is indicated as a DATA signal for convenience' sake. This DATA signal is entered into a shift register 104.

The shift register 104 performs serial-parallel conversion for each line of an image with reception of DATA signals serially supplied in time sequence and operates based on the control signal Tsft sent from the control circuit 103. Namely, the control signal Tsft can also be called as a shift clock for the shift register 104.

Data of one line of an image after the serial-parallel conversion (corresponding to driving data for N devices out of the electron-emitting devices) is outputted as N parallel signals of Id1 to Idn from the shift register 104.

A line memory 105 is a storage device for storing the data of one line of an image for a required time and is configured to store the contents of Id1 to Idn properly according to the control signal Tmry sent from the control circuit 103. The stored contents are outputted as I'd1 to I'dn to enter a modulation signal generator 107.

The modulation signal generator 107 is a signal source for appropriately modulating each of the electron-emitting devices of the present embodiment according to each of the image data I'd1 to I'dn, and output signals therefrom are applied through terminals Doy1 to Doyn to the electron-emitting devices of the present embodiment in the display panel 101.

As described previously, the electron-emitting devices according to the embodiment of the present invention have the following basic characteristics concerning the emission current Ie.

Namely, there is the definite threshold voltage Vth for the emission of electrons and electrons are emitted only when a voltage not less than Vth is applied.

At voltages not less than the electron emission threshold, the emission current also varies according to variation in the applied voltage to the devices. For this reason, when the pulse voltage is applied to the instant devices, for example, electrons are not emitted with application of a voltage not more than the electron emission threshold but an electron beam is outputted with application of a voltage not less than the electron emission threshold.

On that occasion, the intensity of the output electron beam can be controlled by varying the peak height Vm of pulses. It is also possible to control the total charge amount of the output electron beam by changing the width Pw of pulses.

Accordingly, either of the voltage modulation method, the pulse width modulation method, etc. can be employed as a method of modulating the electron-emitting devices according to input signals. For carrying out the voltage modulation method, the modulation signal generator 107 can be a circuit of the voltage modulation method configured to generate voltage pulses of a fixed length and modulate peak heights of pulses adequately according to input data.

For carrying out the pulse width modulation method, the modulation signal generator 107 can be a circuit of the pulse width modulation method configured to generate voltage pulses of a fixed peak height and modulate widths of the voltage pulses adequately according to input data.

The shift register 104 and the line memory 105 are of the digital signal type.

The modulation sinal generator 107 is, for example, a D/A converting circuit and an amplifying circuit or the like is added thereto as occasion demands. In the case of the pulse width modulation method, the modulation signal generator 107 is, for example, a circuit consisting of a combination of a fast oscillator and a counting device (counter) for counting the number of waves from the oscillator with a comparing device (comparator) for comparing an output value of the counter with an output value of the memory.

The configuration of the image-forming apparatus stated herein is just an example of the image-forming apparatus to which the present invention is applicable, and a variety of modifications can be made based on the technical concept of the present invention. The input signals were of the NTSC system, but the input signals are not limited to this system; for example, it is also possible to employ the PAL system, SECAM system, etc., and systems of TV signals consisting of a larger number of scanning lines than them (for example, high-definition TV systems including the MUSE system).

EXAMPLES

More specific examples based on the above embodiments will be described below in detail.

Example 1

In the present example, the basic configuration is comprised of the configuration shown in FIGS. 1A and 1B as described in the above-stated embodiment.

The steps for fabrication of the electron-emitting device according to the present example will be described below in detail with reference to FIGS. 5A to 5E.

(Step 1)

After a silica substrate used as the substrate 1 was cleaned well, a Ti layer 5 nm thick and a Pt layer 500 nm thick, not shown, were first consecutively evaporated over the entire surface of the substrate by sputtering, in order to form the extraction electrode 2 and the negative electrode 3.

Then a resist pattern was formed with an unrepresented positive photoresist (AZ1500 available from Clariant) by the photolithography process.

Figure 5A:
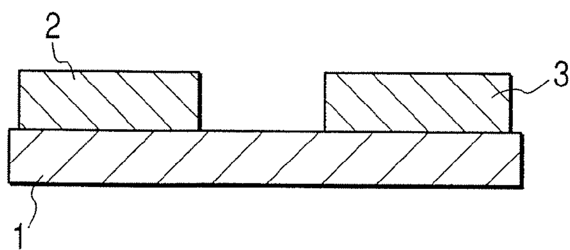
FIGS. 5A, 5B, 5C, 5D and 5E are step diagrams for production of the electron-emitting device according to Example 1 of the present invention.

Using the patterned photoresist as a mask, the Pt layer and Ti layer were then subjected to dry etching with Ar gas to pattern the extraction electrode 2 and the negative electrode 3 with the electrode gap (the width of gap) of 5 μm (a state shown in FIG. 5A).

The patterning of a thin film or a resist by the photolithography process, film formation, lift-off, etching, etc. will be referred to hereinafter simply as patterning.

(Step 2)

Then an unrepresented Cr layer was deposited in the thickness of about 100 nm over the entire surface of the substrate by electron beam evaporation and the positive photoresist (AZ1500 available from Clariant) was patterned thereon.

Using the patterned photoresist as a mask, a region (100 μm×80 μm) to cover the conductive layer for growth of fibrous carbons through the catalyst particles was then formed on the negative electrode 3 and the Cr layer in the opening portion was removed with a cerium nitrate based etchant.

Then a Ti layer for growth of fibrous carbons through the catalyst particles was evaporated in the thickness of 50 nm by sputtering.

Figure 5B:
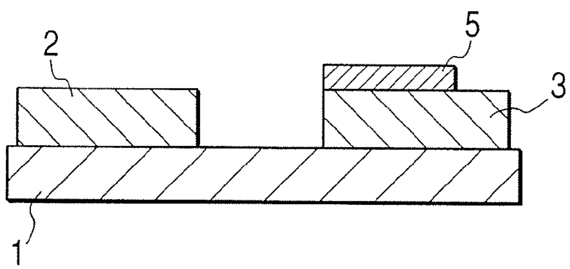

Then the unnecessary Ti layer and resist were removed simultaneously (lift-off method), thereby forming the Ti conductive layer 5 (a state shown in FIG. 5B).

(Step 3)

Figure 5C:
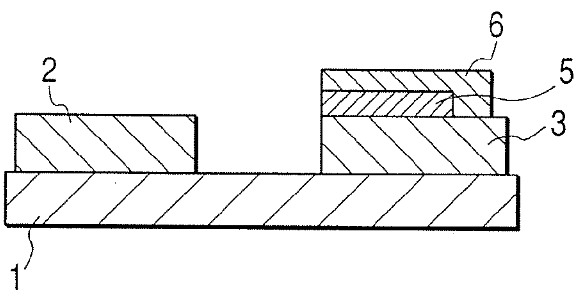
Figure 5D:
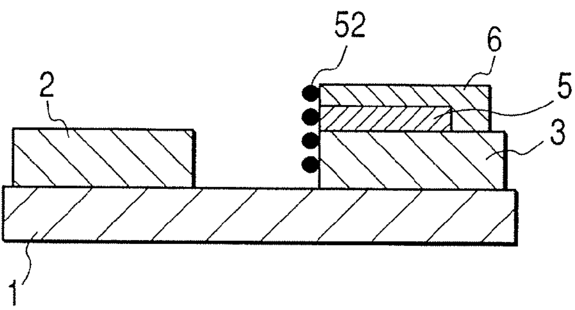
Figure 5E:
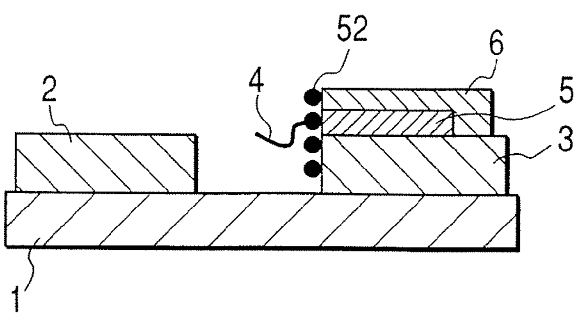

By the patterning similar to step 2, the Ti conductive layer 5 was covered by the Ta conductive layer 6 (140 μm×100 μm) not permitting the growth of fibrous carbons through the catalyst particles, so as to expose only the side wall of the Ti conductive layer 5 on the extraction electrode side (a state shown in FIG. 5C).

(Step 4)

In the subsequent step, an unrepresented Cr layer of about 100 nm was patterned so as to expose only side walls of the Pt/Ti layers (equivalent of the negative electrode 3), the Ti conductive layer 5, and the Ta conductive layer 6 on the extraction electrode side.

Then a complex solution obtained by adding isopropyl alcohol or the like to a Pd complex was applied onto the entire surface of the substrate by spin coating.

After the application, a heat treatment was carried out at 300° C. in the atmosphere to form a palladium oxide layer in the thickness of about 10 nm over the entire surface. Thereafter, Cr was removed with the cerium nitrate based etchant to lift off the unnecessary palladium oxide thereby, thus forming the patterned palladium oxide layer.

After evacuation of atmosphere, the substrate was heated to 200° C. to carry out a heat treatment in a 2% hydrogen stream diluted with nitrogen. At this stage the catalyst particles 52 were formed in particle diameters of about 3 to 10 nm on the wall surfaces in the surface of device. The density of the particles at this time was estimated as about $10^{11}$ to $10^{12}$ particles/cm$^2$ (a state shown in FIG. 5D).

(Step 5)

In the subsequent step, a heat treatment was conducted at 500° C. in a 0.1% ethylene stream diluted with nitrogen for ten minutes. The resultant was observed with the scanning electron microscope and it was verified therefrom that a number of fibrous carbons 4 extending in fibrous shape as bent were formed in the diameters of about 10 nm to 25 nm only on the wall surface of the Ti conductive layer 5 permitting the growth of fibrous carbons through the catalyst particles among the catalyst particles on the wall surfaces.

The thickness of the fibrous carbons 4 at this time was about 500 nm. No fibrous carbon 4 was recognized on the wall surfaces of the Pt layer (negative electrode 3) and the Ta conductive layer 6 not permitting the growth of fibrous carbons through the catalyst particles (a state shown in FIG. 5E).

The electron-emitting device fabricated as described above was set in the vacuum chamber 60 as shown in FIG. 6 and the interior thereof was evacuated well down to the vacuum of $2\times10^{-5}$ Pa by the evacuator 65.

Then the anode voltage of Va=10 kV was applied to the positive electrode (anode) 61 H=2 mm apart from the device, as shown in FIG. 6. At this time, while the pulse voltage consisting of the driving voltage (the voltage placed between the electrodes 2, 3) Vf=20 V was applied to the device, the flowing device current If and electron emission current Ie were measured.

The If and Ie characteristics of the device were those shown in FIG. 7. Namely, Ie demonstrated a sudden increase from about half of the applied voltage and the electron emission current Ie of about 1 μA was measured at Vf of 15 V. On the other hand, If was similar to the characteristic of Ie but values thereof were a figure or more smaller than those of Ie.

The resultant beam was approximately of a rectangular shape slender in the Y-direction and short in the X-direction.

Beam widths were measured under such conditions that the voltage (Vf) placed between the negative electrode 3 and the gate electrode 2 was fixed at 15 V, the anode distance was fixed at H of 2 mm, the anode voltage was either of 5 kV and 10 kV, and the gap (width of gap) was either of 1 μm and 5 μm, and the results are presented in Table 1 below.

TABLE 1

| | Va = 5 kV | | Va = 10 kV | |
|---|---|---|---|---|
| Gap: 1 μm | X-direction | 60 μm | X-direction | 30 μm |
| | Y-direction | 170 μm | Y-direction | 150 μm |
| Gap: 5 μm | X-direction | 93 μm | X-direction | 72 μm |
| | Y-direction | 170 μm | Y-direction | 150 μm |

It was feasible to change the electric field necessary for the driving, by varying the growth conditions. Particularly, an average particle size of Pd particles obtained by the reduction treatment of palladium oxide is associated with the diameters of fibers formed by the growth thereafter.

The mean particle size of Pd particles was able to be controlled by the Pd concentration of the coated Pd complex and the rotational speed of the spin coating.

The carbon fibers of this device were observed with the transmission electron microscope and they were of the layered structure of graphens as shown on the right side of FIG. 12. The layer intervals of the graphens (in the direction of C-axis) were unclear at the temperature as low as about 500° C., and were 0.4 nm. As the temperature increased, the grating intervals became clearer, and at 700° C. the intervals were 0.34 nm, which was close to 0.335 nm of graphite.

By employing the configuration of the electron-emitting device according to the present example, as described above, the electron-emitting device was realized with the properties of the reduced capacitance and driving voltage, the high efficiency, and the small beam size.

Example 2

Figure 2A:
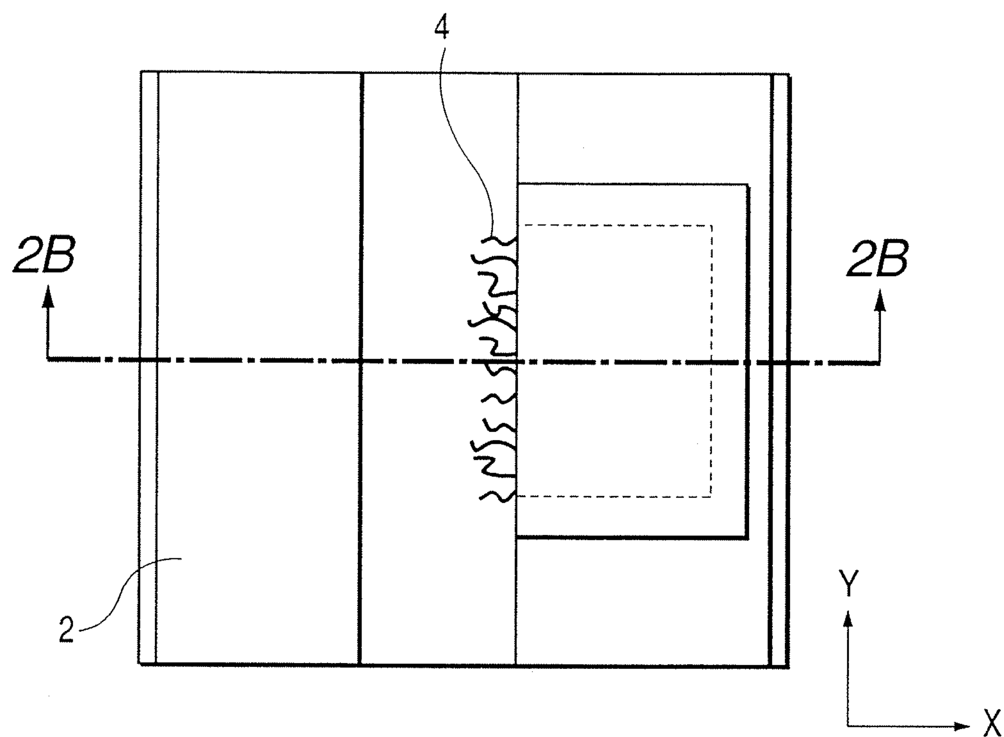
FIGS. 2A and 2B are schematic views showing another electron-emitting device according to Example 2 of the present invention.
Figure 2B:
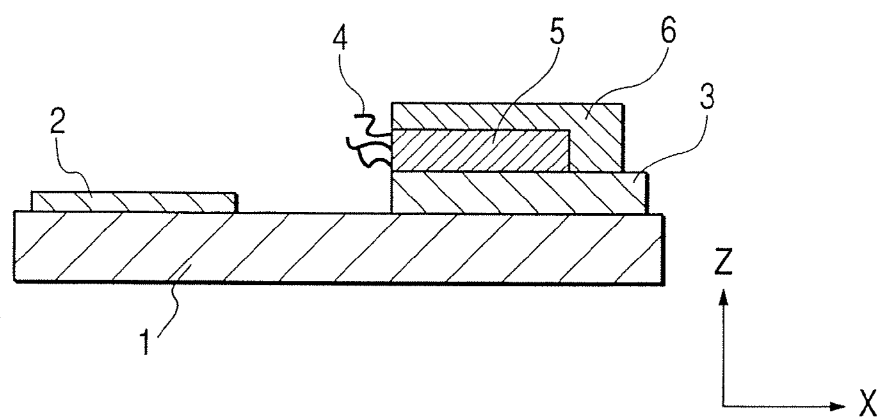

The electron-emitting device according to Example 2 will be described below with reference to FIGS. 2A and 2B. FIGS. 2A and 2B are schematic views of the electron-emitting device according to Example 2 of the present invention, wherein FIG. 2A is a plan view thereof and FIG. 2B a cross-sectional view along 2B-2B in FIG. 2A.

The electron-emitting device in the present example was fabricated in the same manner as in Example 1 in the structure and others except that the thickness of the extraction electrode 2 in Example 1 was changed to 200 nm, and If and Ie were measured therewith.

In the structure of the instant device, the thickness of the negative electrode 3 was larger than the thickness of the extraction electrode 2 whereby the electron emission position was able to be set surely at a higher position (on the anode side) from the extraction electrode 2.

This configuration decreased the number of electrons flying in the trajectories colliding with the gate, so as to be able to prevent the phenomena of decrease of efficiency and increase of the beam size.

As a consequence, in the structure of the present device, the electron emission current Ie of about 1 μA was also measured at Vf of 20 V. On the other hand, If was similar to the characteristic of Ie but values thereof were two figures smaller than those of Ie. The beam sizes at this time were also approximately the same as in Table 1.

By employing the configuration of the electron-emitting device according to the present example, as described above, the electron-emitting device was realized with the properties of the reduced capacitance and driving voltage, the high efficiency, and the small beam size.

Example 3

Figure 3A:
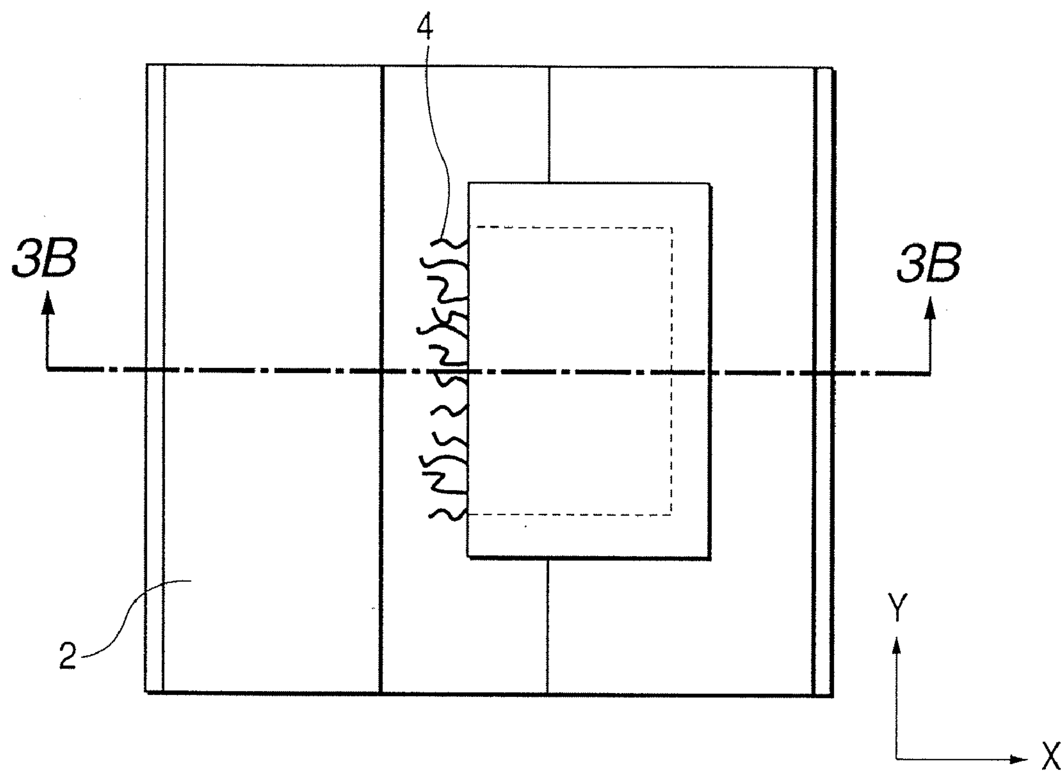
FIGS. 3A and 3B are schematic views showing still another electron-emitting device according to Example 3 of the present invention.
Figure 3B:
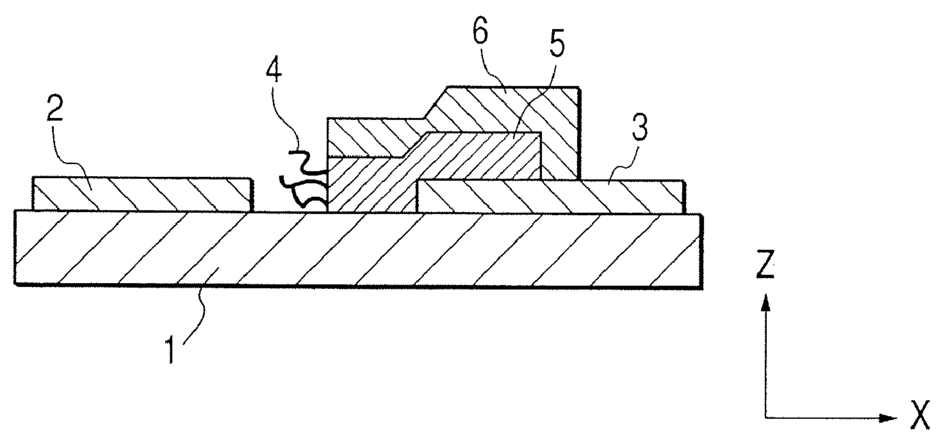

The electron-emitting device according to Example 3 will be described with reference to FIGS. 3A and 3B. FIGS. 3A and 3B are schematic views of the electron-emitting device according to Example 3 of the present invention, wherein FIG. 3A is a plan view thereof and FIG. 3B a cross-sectional view along 3B-3B in FIG. 3A.

In the present example, the conductive layer 5 was formed up to an almost middle point of the gap across the gap from on the surface of the negative electrode 3 to on the surface of the substrate in step 2 in Example 1, whereby the gap distance was made to about half.

Since in the present device the gap distance was smaller than in Example 1, the electric field was about two times stronger than in Example 1. This permitted the voltage for the driving to be reduced to about 8 V. Since the conductive layer 5 was used as an electrical connection layer for the fibrous carbons 4, it became feasible to emit electrons stably from the fibrous carbons 4 in the gap.

By employing the configuration of the electron-emitting device according to the present example, as described above, the electron-emitting device was realized with the properties of the reduced capacitance and driving voltage, the high efficiency, and the small beam size.

Example 4

Figure 4A:
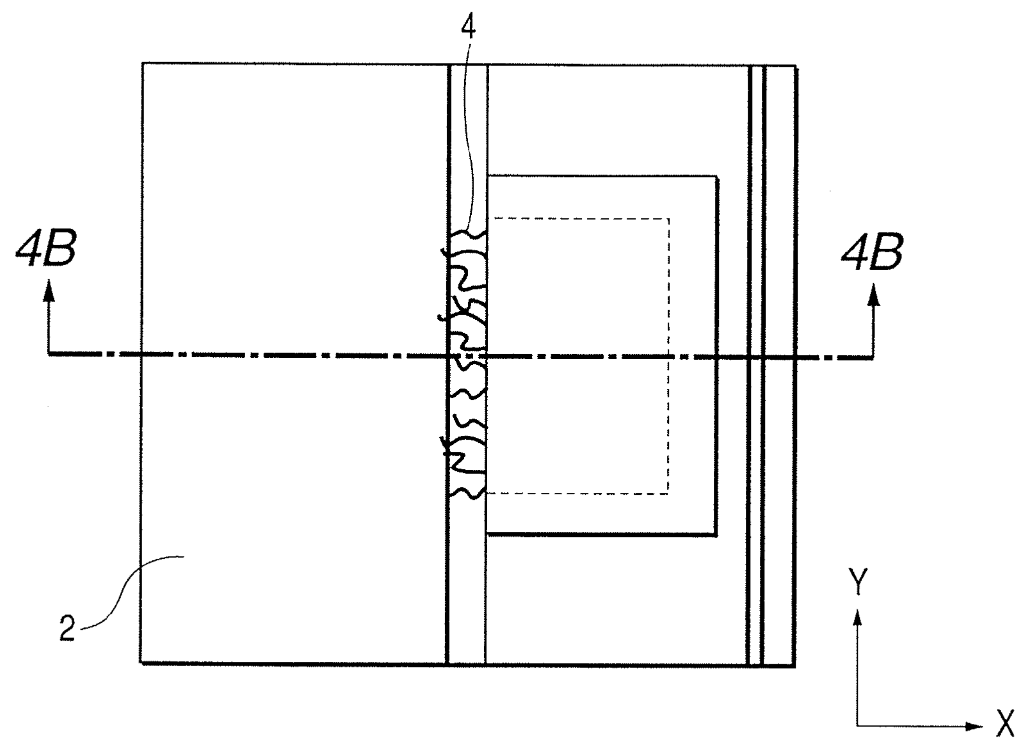
FIGS. 4A and 4B are schematic views showing still another electron-emitting device according to Example 4 of the present invention.
Figure 4B:
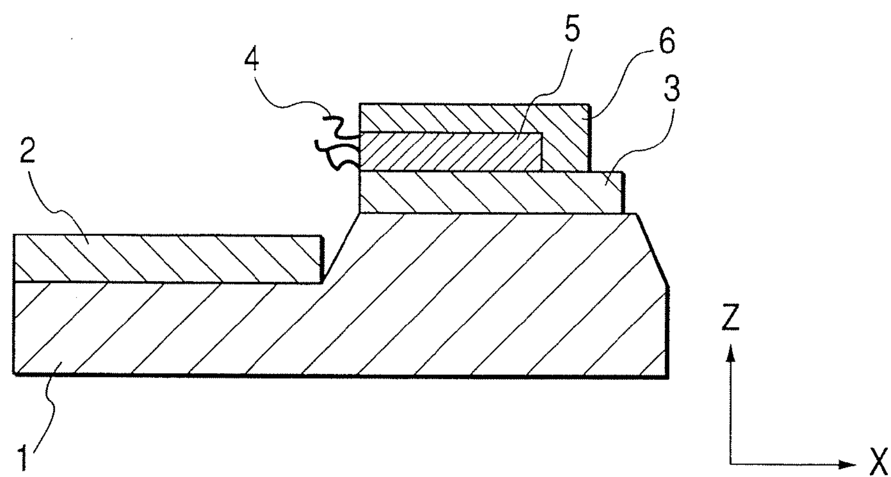

The electron-emitting device according to Example 4 will be described with reference to FIGS. 4A and 4B. FIGS. 4A and 4B are schematic views of the electron-emitting device according to Example 4 of the present invention, wherein FIG. 4A is a plan view thereof and FIG. 4B a cross-sectional view along 4B-4B in FIG. 4A.

The present example is different as follows in step 1 and step 2 described in foregoing Example 1, and the other steps of the present example are the same as in Example 1.

(Step 1)

After the silica substrate used as the substrate 1 was cleaned well, consecutive evaporation by sputtering was conducted to form a Ti layer 5 nm thick and a Pt layer 500 nm thick as the cathode (emitter) electrode 3 and a Ti layer 100 nm thick as the conductive layer 5 permitting the growth of fibrous carbons.

Then a resist pattern was formed with the positive photoresist (AZ1500 available from Clariant) by the photolithography process.

Using the patterned photoresist as a mask, the Ti conductive layer 5 was then etched by dry etching with $CF_4$ and thereafter the Pt and Ti layers were etched by dry etching with Ar, thereby forming the negative electrode 3.

Using the negative electrode 3 as a mask, the silica substrate was etched to the depth of about 500 nm with mixed acids consisting of hydrofluoric acid and ammonium fluoride.

Subsequently, a Ti layer 5 nm thick and a Pt layer 30 nm thick were again consecutively evaporated as the extraction electrode 2 by sputtering. The photoresist on the negative electrode 3 was removed and thereafter a resist pattern was again formed for formation of the gate electrode shape with the positive photoresist (AZ1500 available from Clariant).

Using the patterned photoresist as a mask, the Pt layer and the Ti layer were then etched by dry etching with Ar to form the extraction electrode 2 in such structure that a step difference between steps acted as a gap.

Then a resist pattern was formed on the cathode and fine particles of Ni were formed in the thickness of about 5 nm by resistance heating evaporation with good straight-ahead nature. After that, an oxidation treatment was carried out at 350° C. for 30 minutes. The steps after this step were the same as those in Example 1.

The configuration of this device permitted formation of a finer gap and made it feasible to emit electrons from about 6 V.

Since the height of the electron-emitting material (film thickness) was large, electrons were not emitted only from the upper part of the film but were also emitted from the middle point, so as to be able to prevent the decrease of efficiency and the increase of the beam size due to the collision of electrons with the gate electrode.

Example 5

An image-forming apparatus comprised of a plurality of electron-emitting devices according to the above examples will be described.

The electron-emitting devices of Example 1 were arrayed in a matrix pattern as shown in FIG. 8, thus completing the electron source substrate 81.

Using this electron source substrate 81, the positive electrode (anode) substrate 96 having the fluorescent member 94 was placed at the distance of 2 mm above the electron-emitting devices 84, thus fabricating the image-forming apparatus shown in FIG. 9.

When the apparatus was driven by the pulse voltage of Vf=20 V and Va (voltage applied to the anode)=10 kV, the properties similar to those in Example 1 were also yielded in the image-forming apparatus.

According to the present invention, as described above, the fibrous carbons are grown only on the side wall surface of the conductive layer on the extraction electrode side, whereby it is feasible to decrease electrons emitted from the other surfaces than the conductive layer, to enhance the electron emission efficiency, and to improve convergence of trajectories of emitted electrons.

When the electron-emitting devices superior in the electron emission efficiency and in the convergence of electron trajectories as described are applied to the electron source, the electron source can be realized with high quality. When this electron source is applied to the image-forming apparatus, the image-forming apparatus can implement formation of higher definition images.

What is claimed is:

1. A method for manufacturing an electron-emitting device comprising steps of:

preparing a substrate provided with a first electrode and a second electrode disposed in opposition to each other sandwiching a gap between the first and second electrodes;

forming a first layer on the first electrode and covering the first layer with a second layer of a material from which a fiber containing carbon can hardly be grown rather than a side of the first layer facing the second electrode so that the side of the first layer facing the second electrode is exposed; and applying a catalyst to the side of the first layer facing the second electrode and forming the fiber containing carbon on the side of the first layer facing the second electrode.

2. The method for manufacturing the electron-emitting device according to claim 1, wherein the second layer is formed of at least one of Ta, Cr, Au, Ag, Pt and a material constituting the catalyst.

3. The method for manufacturing the electron-emitting device according to claim 1, wherein the catalyst is formed of Fe, Co, Pd, Ni or an alloy of materials selected from Fe, Co, Pd, Ni.

4. The method for manufacturing the electron-emitting device according to claim 1, wherein the first layer is formed of a mixture of Ti and an oxide of Ti, a titanium oxide semiconductor, a mixture of Zr and an oxide of Zr, a zirconium oxide semiconductor, a mixture of Nb and an oxide of Nb, or a niobium oxide semiconductor.

5. The method for manufacturing the electron-emitting device according to claim 1, wherein the first layer is constituted of a semiconductor of an oxygen deficient type formed from an oxide of Ti, Zr or Nb.

* * * * *